United States Patent [19]

Bean et al.

[11] Patent Number: 4,811,279
[45] Date of Patent: Mar. 7, 1989

[54] SECONDARY STORAGE FACILITY EMPLOYING SERIAL COMMUNICATIONS BETWEEN DRIVE AND CONTROLLER

[75] Inventors: Robert G. Bean; Michael E. Beckman; Barry L. Rubinson; Edward A. Gardner; O. Winston Sergeant; Peter T. McLean, all of Colorado Springs, Colo.

[73] Assignee: Digital Equipment Corporation, Maynard, Mass.

[21] Appl. No.: 58,591

[22] Filed: Mar. 9, 1987

Related U.S. Application Data

[63] Continuation of Ser. No. 823,121, Jan. 24, 1986, abandoned, which is a continuation of Ser. No. 570,412, Jan. 12, 1984, abandoned, which is a continuation of Ser. No. 308,593, Oct. 5, 1981, abandoned.

[51] Int. Cl.$^4$ .............................................. G06F 13/00
[52] U.S. Cl. ................................................. 364/900
[58] Field of Search ... 364/200 MS File, 900 MS File

[56] References Cited

U.S. PATENT DOCUMENTS

| Re. 31,318 | 7/1983 | Kaufman et al. | |
|---|---|---|---|
| 3,078,443 | 2/1963 | Rose | |
| 3,336,586 | 8/1967 | Beausoleil et al. | |
| 3,801,969 | 4/1974 | Sordello | |
| 3,860,808 | 1/1975 | Sakoda | 364/200 |
| 3,905,023 | 9/1975 | Perpiglia | |
| 4,025,903 | 5/1977 | Kaufman et al. | |
| 4,028,663 | 6/1977 | Royer et al. | |
| 4,051,459 | 9/1977 | Steranko | |
| 4,053,752 | 3/1979 | De John | 364/200 |
| 4,077,059 | 2/1978 | Cordi et al. | 364/200 |
| 4,084,231 | 4/1978 | Capozzi et al. | 364/200 |
| 4,096,567 | 6/1978 | Millard | 364/200 |
| 4,107,784 | 8/1978 | Van Bemmelen | |
| 4,142,232 | 2/1979 | Harvey | |
| 4,144,583 | 3/1979 | Lawson et al. | |
| 4,181,934 | 1/1980 | Marenin | 364/200 |
| 4,228,496 | 10/1980 | Katzman | |
| 4,261,034 | 4/1981 | Saccomano et al. | 364/200 |
| 4,293,928 | 10/1981 | Baun et al. | |
| 4,298,954 | 11/1981 | Bigelow | |
| 4,310,895 | 1/1982 | Edstrom et al. | |
| 4,325,120 | 4/1982 | Colley | 364/200 |
| 4,339,793 | 7/1982 | Marenin | 364/200 |
| 4,396,978 | 8/1983 | Hammer | |
| 4,533,997 | 8/1985 | Furgerson | |

FOREIGN PATENT DOCUMENTS

| 54-99538 | 8/1979 | Japan . |
| 2045479 | of 0000 | United Kingdom . |

OTHER PUBLICATIONS

English Translation of Japanese Application No. 54-99538.
"Feature Analysis of Selected Database Recovery Techniques" by Bhargava et al., AFIPS Conference Proceedings, 1981 National Computer Conference.
"System Structure for Software Fault Toleranc", Brian Randell, IEEE Transactions on Software Engineering, vol. SE-1, No. 2, Jun. 1975.
"Applicants' Information Disclosure Statement" filed in Ser. No. 946,891 on Dec. 15, 1987.
T921,023, Carter et al., U.S. Defensive Publication.
1440 IBM Praxis Nr. 4, (IBM Form 80 104–2).
IBM Systems Reference Library.

Primary Examiner—David Y. Eng

[57] ABSTRACT

A radial bus for use in a secondary storage subsystem, between a mass storage drive and controller. The bus has four unidirectional bit-serial channels, two for carrying signals from drive to controllers. One channel carries real-time drive state information to the controller; another carries real-time controller state information to the drive. The state information is a sequence of multiplexed bits sent in continuous repetition. Most status variables are represented as a single bit in a specific place in the sequence; the set of status variables defining drive state or controller state, as the case may be, is thus provided by a sequence of bits. When such a bit changes state, a potential change of status has occurred; the change is required to persist some number of repetition of the sequence before the state change is recognized, to avoid spuriously signalling a state change.

8 Claims, 41 Drawing Sheets

| CHANNEL | DRIVE STATE RELATIVE TO CONTROLLER | | | |
| --- | --- | --- | --- | --- |
| | DRIVE-OFFLINE | DRIVE-UNAVAILABLE (DRIVE-ONLINE TO OTHER PORT) | DRIVE-AVAILABLE | DRIVE-ONLINE |
| READ/RES DATA | OFF | OFF | ZEROES OR DATA OR OFF | ZEROES OR DATA OR OFF |
| REAL-TIME DRIVE STATE | CLOCK | STATE BYTE AND CLOCK AS SENT TO ON-LINE DRIVE | STATE BYTE AND CLOCK | STATE BYTE AND CLOCK OR OFF |

*Fig. 2*

Fig. 8A  MESSAGE START:
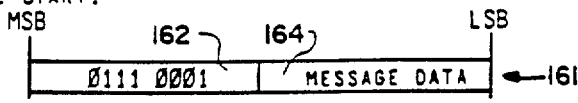
Fig. 8B  MESSAGE CONTINUATION:
Fig. 8C  MESSAGE END:
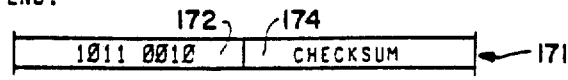
Fig. 8D  SELECT GROUP:
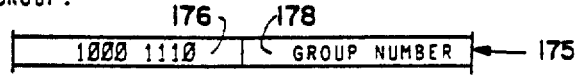
Fig. 8E  SELECT TRACK AND READ:
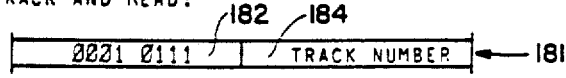
Fig. 8F  SELECT TRACK AND WRITE:
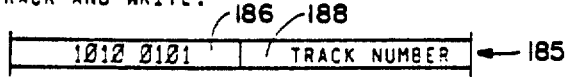
Fig. 8G  SELECT TRACK AND FORMAT ON INDEX:
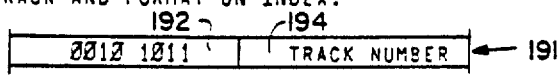
Fig. 8H  FORMAT ON SECTOR OR INDEX:
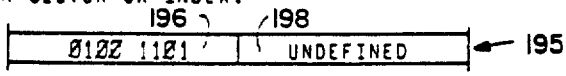
Fig. 8I  DIAGNOSTIC ECHO:
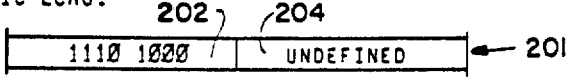

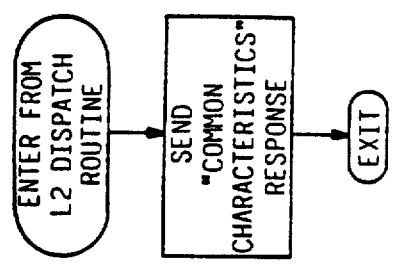
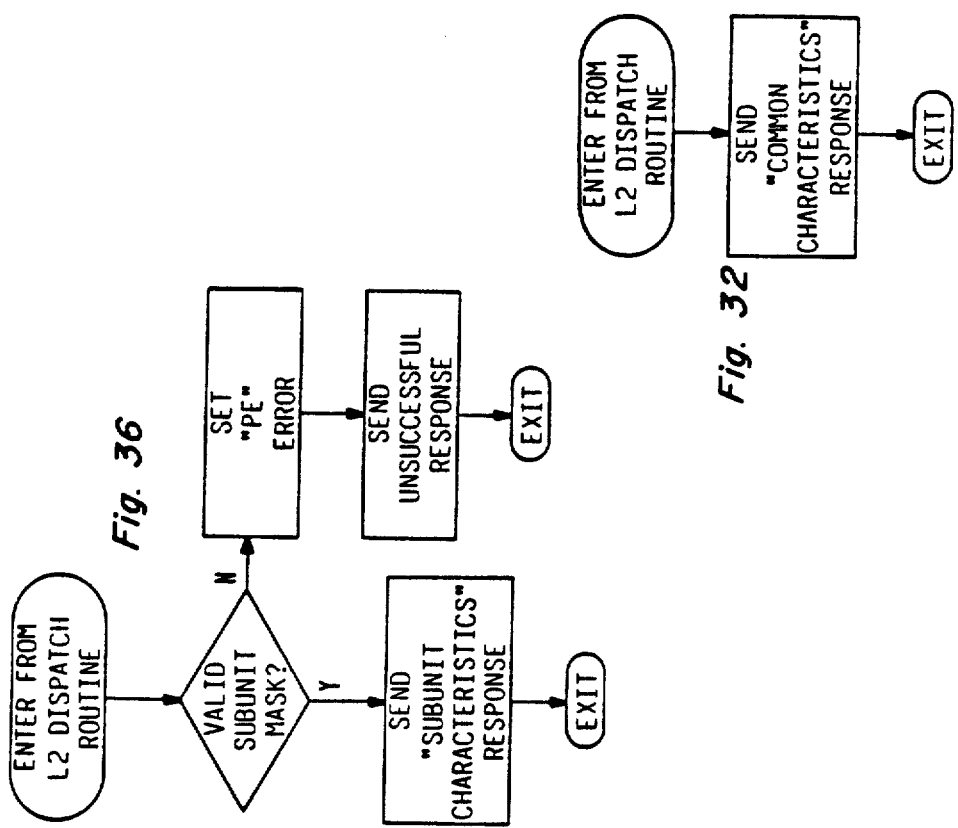
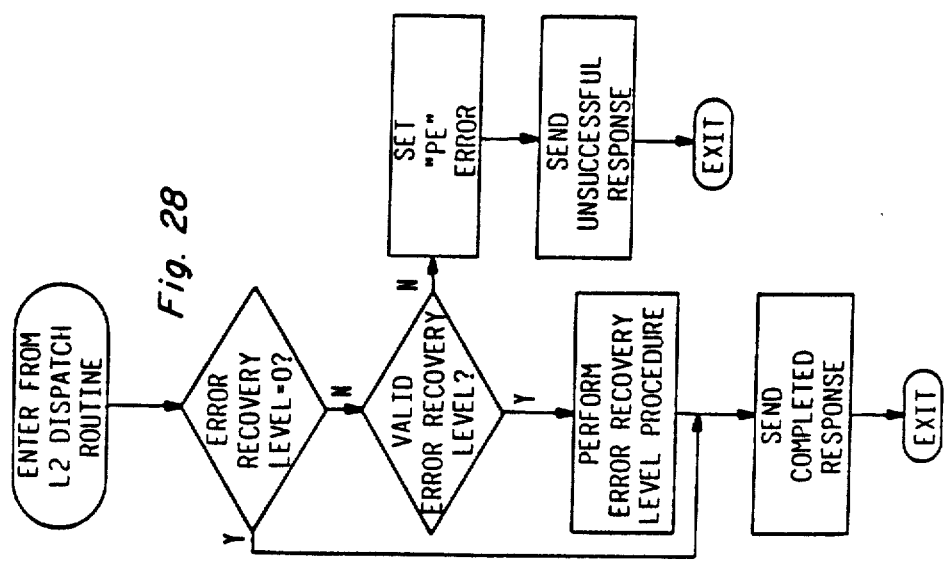

SECONDARY STORAGE FACILITY EMPLOYING SERIAL COMMUNICATIONS BETWEEN DRIVE AND CONTROLLER

CROSS REFERENCE TO RELATED APPLICATIONS

This application is a continuation of U.S. patent application Ser. No. 823,121, filed on Jan. 24, 1986, now abandoned, which is a continuation of U.S. patent application Ser. No. 570,412, filed on Jan. 12, 1984, now abandoned, which is a continuation of U.S. patent application Ser. No. 308,593, filed on Oct. 5, 1981, now abandoned.

The following commonly assigned U.S. Patents are incorporated by reference herein to clarify the environment, intended use and explanation of the present invention: U.S. Pat. No. 4,449,182, entitled "Interface Between a Pair of Processors, Such as Host and Peripheral-Controlling Processors in Data Processing Systems," filed on Oct. 5, 1981 as U.S. patent application Ser. No. 308,826 and U.S. Pat. No. 4,434,487, entitled "Disk Format For Secondary Storage System," filed on Oct. 5, 1981 as U.S. patent application Ser. No. 308,771.

FIELD OF THE INVENTION

This invention relates generally to data processing systems and, more specifically, to secondary (or mass) storage facilities utilized for storing data in such systems. In particular, it relates to a secondary storage facility using serial communications between controller and drive, with information being transmitted over just four conductors.

BACKGROUND OF THE INVENTION

Secondary storage facilities used in data processing systems generally comprise a storage device controller and one or more drives connected to the controller. The drives include, but are not limited to, direct access memory devices, such as magnetic disk and magnetic bubble memories.

These secondary storage facilities, especially facilities using magnetic disk memory devices as the drives, have become very sophisticated in recent years. However, in efforts to increase performance, interconnections between controllers and drives have increased in complexity. One of the more significant results of such increased complexity is that controllers are adapted to be used only with certain drives, and vice-versa. This is a result largely of the communications employed between a controller and a drive. Thus, as new drives are developed, it is generally necessary also to develop new controllers for use with them.

Cabling and connector costs also have become significant, since high reliability is needed and information must be transmitted at high rates. Such costs, in turn, are directly related to the number of conductors needed in the cable; each conductor requires at least a receiver and/or transmitter for the termination at both the controller and drive ends of the cable.

Further, multiple controllers and/or drives frequently are interconnected via a time-shared communications channel, termed a bus. By nature of the time-sharing arrangement, an individual controller generally can communicate with only one drive at a time.

Therefore, it is an object of this invention to provide a secondary storage facility and, more particularly, an interconnection between controllers and drives in such a facility, wherein the complexity and costs of interconnecting a drive with its controller are reduced over prior secondary storage facilities.

Another object of this invention is to provide a standard interconnection for future block-addressable secondary storage system products, which is not drive specific and, thus, supports an arbitrary mix of controller types and peripheral drive types.

Still another object of this invention is to provide a controller/drive interconnection which is capable of permitting communications between a controller and drive at a high bit rate.

Yet another object of this invention is to provide a secondary storage facility in which the cabling between the controller and drive may be physically small, utilize a minimum number of conductors and be up to at least one hundred feet in length.

Another object of this invention is to provide a wide and flexible architecture in the storage system interconnection, via the use of a hierarchical, multi-level communications protocol.

Still another object of the invention is to provide an interconnection whereby the controller is provided with effective real-time rotational position sensing information concurrently from every drive with which it is connected.

SUMMARY OF THE INVENTION

In accordance with this invention, the foregoing objects are achieved primarily by using serial, rather than parallel, signal transfers between the controller and drive, and also by using special signal handling techniques.

The controller/drive interconnection of this invention is radial; that is, it uses a separate dedicated cable between each controller/drive pair. Thus, all communications over a given cable occur between a specific controller and a specific drive. There is no bus arbitration or drive addressing in the bus proper; simultaneous transactions on more than one drive are therefore supported by the bus structure.

Each controller/drive interconnection cable contains four conductors, and each of those conductors carries one channel of information. The channels are all unidirectional. A first channel is used for sending command messages and data to be written, from controller to drive. The second channel carries the response messages and data read from the drive, sent from drive to controller. The third and fourth channels carry real-time signals from controller to drive and from drive to controller, respectively, for use in synchronizing and coordinating transmissions, and also for notification of significant state changes.

A multi-layered protocol is employed for controller-drive communications The first level governs the electrical transmission of messages. Framing of command messages and data operations take place at a second level and a third level is used for command and response exchanges. The protocol is synchronous and supports variable length, multiple byte messages, each bounded by specific beginning and end frames. Specific command/reponse exchanges are identified for communicating from the drive to the controller certain parametric information about the drive, which the controller must know to be able to use the drive.

This invention is pointed out with particularity in the appended claims. The above and other objects, features and advantages of the invention may be better understood by referring to the following detailed description, which should be read in conjunction with the accompanying drawings.

BRIEF DESCRIPTION OF THE DRAWING

FIG. 2 is a table summarizing the overall nature of information on the bus 10 of FIG. 1, as a function of drive state relative to controller;

FIGS. 8A–8I are diagrammatic illustrations of the format for each possible Level 1 (i.e., intermediate protocol level) frame tramsmitted on bus 10;

FIG. 25 is a flow chart of the processing of the DISCONNECT command by the drive;

FIG. 28 is a flow chart of the drive's processing of the ERROR RECOVERY command;

FIG. 32 is a flow chart of the drive's processing of the GET COMMON CHARACTERISTICS COMMAND;

FIG. 36 is a flow chart of the drive's processing of the GET SUBUNIT CHARACTERISTICS command;

DESCRIPTION OF AN ILLUSTRATIVE EMBODIMENT

Overview

Figure 1:
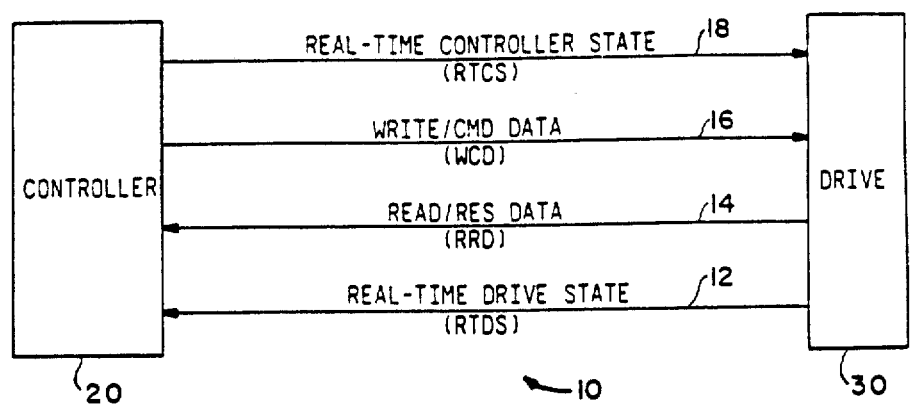
FIG. 1 is a diagrammatic illustration of the controller-drive communications channels in a bus according to the present invention.

Referring now to FIG. 1, there is shown a diagrammatic illustration of the physical cable channels and their meanings. The cable (or bus), indicated generally at 10, consists of four lines, 12–18, which are used to transmit ten logical signals between a controller 20 and a drive 30. All four bus lines are unidirectional high-speed bit-serial channels. When the term "unidirectional channel" is used herein it is intended in the foregoing sense - that is, it signifies a single conductor or wire over which bit-serial communications are provided and which is terminated at one end by a transmitter and at the other end by a receiver, so that transmissions take place in only one direction over the conductor. Lines 12 and 18 repeatedly transmit serialized real-time state signals and lines 14-16 serially transmit drive control protocol messages as well as read data and write data. The state signals on lines 12 and 18 are sent repetitively. Line 12 carries real-time drive state (RTDS) signals from the drive 30 to the controller 20, for use in coordinating and synchronizing transmissions and for notification of significant state changes. Line 14 carries read data/response data (RRD) messages from drive to controller. Line 16 carries write data/command data (WCD) messages from controller to drive. Line 18 carries real-time controller state (RTCS) signals from controller to drive, for use in coordinating and synchronizing transmissions and for notification of significant state changes.

Preferably the information transmitted over all four channels is encoded in accordance with the encoding scheme described in commonly assigned patent application No. 301,193 titled Frequency-Independent, Self-Clocking Encoding Technique and Apparatus for Digital Communications, filed on Sept. 11, 1981 by Peter T. McLean and O. Winston Sergeant which was issued on Oct. 2, 1984 as U.S. Pat. No. 4,475,212. Other encoding schemes may be employed, so long as a self-clocking code is used; there is no provision for a separate clock signal to be transmitted.

Logical signals are provided to convey directly to the controller the sector and index pulses from each drive. This provides the controller with the necessary information to keep track, in real time, of disk rotational position.

As stated above, messages are transmitted between controller and drive by means of a drive control protocol having three layers. Each layer has an interface to the layer(s) above and/or below it, and each has syntactically and semantically defined rules used for communicating over the cable. The lower layers can be implemented in hardware or software. The lowest level, "Level 0", governs the electrical transmission of the messages along the cable. "Level 1" provides the mechanism by which individual messages are framed (i.e., their beginning and end is identified and transmission errors detected) and by which data operations take place. "Level 2" is the level at which command/response exchanges take place.

At the two lower levels, the control protocol is the same for commands and responses; that is, it is symmetrical. For example, commands and responses are of different content and length, but the identification of the start and end of the message and the location of the checksum is the same in both cases. The "Level 2" protocol, however, involving commands and responses, requires an asymmetrical interpretation.

The Level 2 protocol imposes a strict master/slave relationship on communications between the controller and the drive. The controller is the master and is responsible for initiating all exchanges; the drive is the slave and its activity is limited largely to completing exchanges by giving appropriate responses. It also notifies the controller of important changes in its status, via an Attention mechanism.

The Level 2 protocol is synchronous. Each Level 2 command to a drive results in a single response from the drive when that command has been executed. The nature of the response indicates the successful or unsuccessful interpretation and execution of the command. This response uniquely specifies the point at which the drive is ready for another command; it also guarantees that commands are processed in their proper order because, by convention, a new command not sent by the controller until the response for the previous command is received and validated, and all errors resulting from that command have been resolved.

Although it is completely synchronous, the protocol employs an ATTENTION signal as a means for the drive to notify the controller asynchronously that an important error condition or change in status has occurred and requires handling. The controller then deals with the condition by initiating the synchronous exchanges necessary to determine and resolve the condition at a time when both drive and controller are in known, controlled states.

The protocol supports variable length, multiple byte messages. Each message is bounded by a unique beginning and termination; message length is implicit rather than explicit.

Definitions

It will be helpful, before proceeding, to define certain additional terminology which will be used herein.

"Write data" refers to data to be recorded onto a drive. "Read data" refers to data to be retrieved from the drive.

A "sync character" is a twelve-bit binary pattern which identifies the start of meaningful data coming across the serial data lines. The exemplary pattern used herein is 111101011001 (serialized left to right). It is preceded on the line by an undefined number of leading zeros and is followed immediately by two zeros which are then followed by the first bit of meaningful information. Further explanation of this synch character are provided in commonly assigned copending application Ser. No. 06/274,420, titled Circuit for Serializing and Deserializing Digital Data, filed June 17, 1981 by Lih-Jyh Weng, et al, the disclosure of which is hereby incorporated by reference herein.

The sync pattern is an autocorrelation pattern; the requirement for a "match" between the sync pattern and the received pattern is that any nine out of the twelve received bits match their counterparts in the sync pattern. The sync pattern is recorded on the disk, preceding the headers and data of each sector, and thus must be recognized by the controller even though up to three bits are in error when it is coming from the disk. However, when the sync character is being used as a communications sync character on the interconnection bus, the controller has the option of requiring an exact match.

"Attention condition" is a term used to indicate that a status change in an online drive has occurred and that it is significant enough to warrant controller host interaction.

A "multi-unit drive" is a single drive attached to a controller via a single interconnection cable, which has media divided into multiple independent subunits, each subunit representing a distinct logical unit to the host.

A "sector" is the smallest unit by which data is addressed physically. Each sector occupies a specific physical position relative to an index location on a disk, and has the property that it is available for reading or writing once per disk rotation.

Sectors are grouped together hierarchically for addressing purposes. First, a disk surface is divided into one or more "cylinders." In turn, cylinders are divided into "groups;" and groups are divided into "tracks".

A "Track" refers to a logical entity representing a set of sectors occupying contiguous logical disk locations.

A "group" is, in turn, a logical entity representing a set of tracks such that individual tracks in a group can be selected within the inter-sector rotation time. Tracks in the same group are "aligned" such that the same physical sector address is available for reading or writing simultaneously on all tracks in the group.

A "cylinder" is a logical entity representing a collection of groups which can be selected via an operation with latencies less then the minimum "seek" time.

Note that by these definitions, the terms track, group and cylinder are independent of physical organization or construction of the drive. They simply relate sectors to each other as a function of access characteristics.

The "sector number" portion of a physical sector address is always the low order portion. The "track number" portion of a specific sector physical address is always the middle portion of that address between group and sector. The "group number" portion of a specific sector physical address is always the middle portion of that address, between cylinder and track.

The "cylinder number" portion of a specific sector physical address is always the highest order portion of that address.

A "frame" is a sixteen-bit quantity comprising the smallest unit of control information passed between the controller and the drive by the interface hardware. Every frame is conceptually partitioned into two eight-bit bytes.

A "control message" is a set of sequentially transmitted frames starting with a "start frame" and terminating with an "end frame". Its contents comprise a message that conveys information between the controller and drive. A "command" is a control message from the controller to the drive; a "response" is a control message sent from the drive to the controller. An "exchange" is a pair of control messages, the first one being the command issued by the controller and the second one being the response sent by the drive.

The "command timer" and "response timer" are mechanisms in the drive and controller, respectively, used to monitor subsystem activity. They serve to sustain the minimum subsystem activity necessary to assure that the drive and controller are both still active, and signal when the minimum activity is not sustained in either the controller or drive, so that one must be considered "inoperative".

"Drive-offline" is one of the drive's states relative to the controller. When in the "drive-offline" state, the drive is not operational and may not communicate with the controller via the drive control protocol.

"Drive-unavailable" is another of the drive's states relative to the controller. In this state, the drive is operating, is visible to, and may at times communicate with the controller; but the controller may not fully utilize the drive because the drive is "drive-online" to another controller.

"Drive-available" is another of the drive's states relative to the controller. In this state, the drive is visible to, capable of communicating with, and capable of becoming "drive-online" to a controller, but is not currently "drive-online" to any specific controller.

"Drive-online" is another of the drive's possible states relative to the controller. In this state, a drive is dedicated to the exclusive use of a particular controller and is not available to any alternate controller.

"Generic status" is a subset of the status information maintained by the drive that is independent of drive type. It provides the basic information necessary for normal drive operation.

The "request byte" is one of the status bytes in the generic status. It is used to signal requests from the drive for controller action.

The "error byte" is another one of the status bytes in the generic status. It is used to signal error conditions that prevent normal drive operation.

The "mode byte" is still another status byte in the generic status and is used to store the current state of those drive operating modes that are alterable by the controller.

The Cable Signals

The table in FIG. 2 summarizes the overall nature of information on each of the lines in a bus 10 carrying information from a given drive to a given controller, as a function of drive state relative to that controller.

Several comments will help clarify FIG. 2. First, the designation "off" means that no transitions exist. Second, data on RRD line 14, in the "drive-available" state, is sent only to the commanding port if there are multiple ports. Third, in the "drive-unavailable" state the drive is not listening to the controller's state. Fourth, "clock" in the "drive-offline" state means that the drive transmits a state clock but no state bytes. Fifth, the RTDS line 12 will be "off" (i.e., convey no transitions) while a drive is initializing or is broken or its port is disconnected. Sixth, in the "drive-online" state, the RTDS channel will be "off" during execution of the TOPOLOGY command (discussed below). Further, seventh, during drive execution of a TOPOLOGY command, lines to a "drive-unavailable" drive will temporarily take on characteristics identical to those for "drive-available" drives.

The RTDS signal on line 12 is used to transmit six logical signals from drive to controller. These are needed to synchronize controller/drive operations. It is a single byte preceded by a "zero" byte. This two byte pattern is sent continously by drives to all controllers for which the drive port switches are enabled. The RRD signal on line 14 transmits self-clocked digital data from the drive to the controller, LSB first. Two types of information are sent over the RRD line: (1) the read data that is being retrieved from the disk surface; and (2) response messages from the drive to the controller.

The WCD signal on line 16 transmits self-clocked digital data from the controller to the drive, LSB first. Three types of information are sent over the WCD line: (1) write data to be recorded onto the disk surface; (2) command messages from the controller to the drive; and (3) real-time data transfer commands.

The RTCS signal on line 18 communicates four logical signals used for synchronizing controller/drive operations. The RTCS signal is a pattern of a single byte preceded by a "zero" byte. This two-byte pattern must be sent repeatedly any time the drive is selected by the controller. A controller may send the pattern continously for a "drive-online" drive or may transmit it only when the drive is selected. It is the responsibility of the drive to maintain the last "state" received and assume that this state is valid until an update is received.

When switching its state transmission activity between drives, the controller must complete a state word to the current drive and begin with a complete word (including preamble) to the new drive. Due to possible skew in synchronizing, state bits cannot be encoded—i.e., they must be able to change validly independently of each other.

Synchronization detection is accomplished by sensing at least seven zeros followed by a one.

Figure 3:
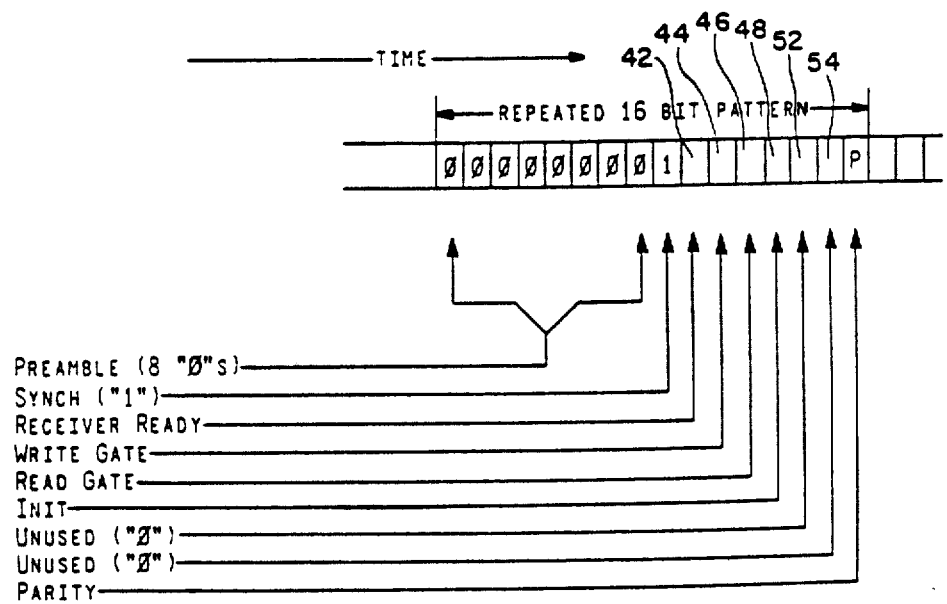
FIG. 3 is an illustration of the format of the RTCS signal on line 18 of FIG. 1.

FIG. 3 illustrates the RTCS signal and defines the position and significance of each of its bits. Bit 42, the first bit following the end of the sync pattern, provides the RECEIVER READY signals. (There are two RECEIVER READY signals, one from the controller to the drive and one from the drive to the controller; both are logical signals, the assertion of which is used to indicate that the issuing party is in command mode and is ready to receive a message frame.)

Bit 44 contains the INIT signal, which is a logical signal from the controller to the drive, used as a drive initialization signal; the standard sequence used by the controller to initialize the drive is to assert the INIT bit. Each time a controller is powered up or reinitialized by the host or by operator command, it will generate an INIT signal to all drives to which it may connect. This is used to synchronize those drives that are waiting for the controller to become active, and will have no effect on drives "drive-online" to another controller.

The leading edge of the INIT signal instructs the drive to take the following actions:

(1) place its microprocessor in a known location and context;

(2) abort all operations in context, including any data transfers, and bring all mechanical movements to a controlled stop, if possible;

(3) within a predefined interval after the controller's assertion of the INIT signal, stop all transitions on both the RRD and RTDS lines for a defined interval;

(4) save its generic and extended status at the time it was interrupted (see below);

(5) execute a reinitialization sequence and perhaps certain minimum integrity diagnostics; and (6) upon completion of the reinitialization sequence, load the "DF" status bit, update other generic and extended status to appropriate current values, return to the drive's previous state relative to all controllers and assert ATTENTION and/or AVAILABLE.

Finally, the drive asserts RECEIVER READY to signal completion of the initialization sequence.

Bit position 46 conveys a "READ GATE" signal, which is a logical signal transmitted from the controller to the drive. During a read data operation, READ GATE is asserted after the header splice and before the beginning of the data field preamble, and remains asserted until after the last bit has been read. The trailing edge of READ GATE indicates to the drive that the current data transfer command is finished.

Bit 44 contains a WRITE GATE signal, which is a logical signal transmitted from controller to drive. The trailing edge of the WRITE GATE signal indicates to the drive that the current data transfer command is finished.

Figure 4:
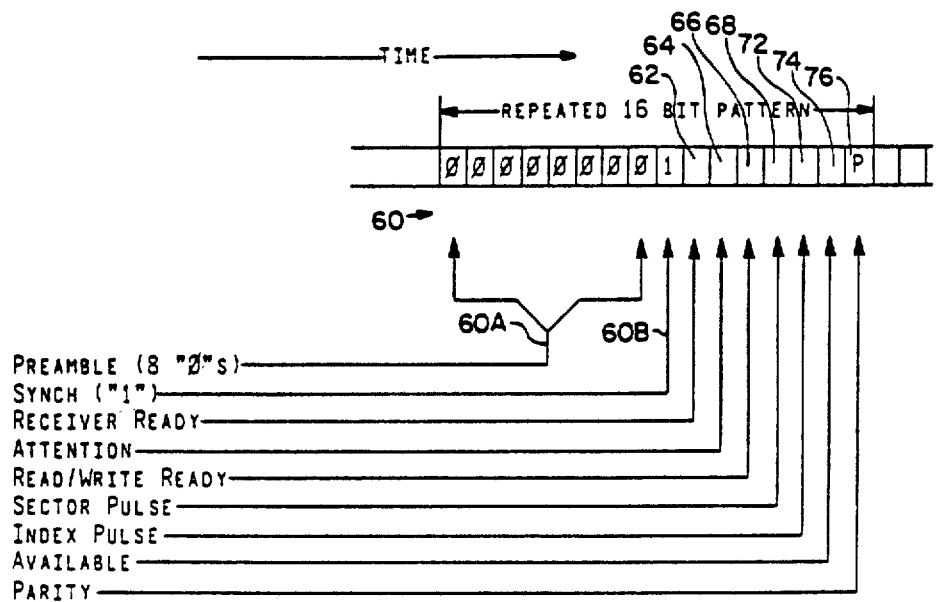
FIG. 4 is an illustration of the format of the RTDS signal on line 12 of FIG. 1.

The RTDS frame format is indicated in FIG. 4. As shown there, the frame 60 comprises a preamble 60A of eight 0's followed by a sync bit 60B, which is a 1, six information bits 62–74 and a parity bit 76.

Bit 62 is a RECEIVER READY signal, which is a logical signal whose assertion is used to indicate that the drive is in command mode and is ready to receive a command frame.

Bit 64 is an ATTENTION signal, which is a logical signal from the drive used to notify the controller that a potentially significant status change has occurred in the drive. If it is appropriate for a "drive-online" drive to assert ATTENTION, the signal is asserted regardless of whether a command is in progress or not. The drive continues to assert this signal until it receives a valid GET STATUS command from the controller; it will then lower the signal immediately after receipt of the end frame.

Bit 66 conveys a READ/WRITE READY signal, which is a logical signal from the drive to the controller signifying, when asserted, that the drive is capable of handling a data transfer to or from the disk surface.

Bit 68 conveys a SECTOR PULSE signal. This is a logical signal from the drive to the controller signalling that the head is at the boundary of one of the sectors into which the disk is divided. The controller uses the leading edge of the SECTOR PULSE signal for rotational position sensing, and the trailing edge as the beginning of the sector. The SECTOR PULSE signal must be at least 32 state bit transmission times in duration for the exemplary embodiment illustrated herein.

Bit position 72 transmits an INDEX PULSE—i.e., a logical signal from the drive to the controller asserted once every revolution. Like the SECTOR PULSE signal, the INDEX PULSE signal must last for at least 32 state bit transmission times. The controller uses the leading edge of the INDEX PULSE signal for rotational position sensing and the trailing edge to mark the beginning of sector number 0.

Bit position 74 contains an "Available" bit, which is a logical signal from the drive to the controller indicating that the drive is in the "drive-available" state. It is asserted whenever the drive enters the "drive-available" state, remains asserted as long as the drive remains in that state, and is lowered when the drive leaves that state.

Drive Control Protocol

The following general rules govern the drive control protocol.

First, only one command or operation can be outstanding on a drive. The controller cannot initiate another command or operation until the response to the current one is received.

Second, all commands from the controller to the drive initiate an exchange. After issuing a command, the controller sets its response timer and enters a state where it is waiting for the response to that command. If the response timer expires, the controller will assume that the message was not received. Third, some Level 2 commands may result in a drive operation that extends beyond the completion of the exchange. In this case, the completion of the drive operation is signalled in one of two ways: (1) the raising of the READ/WRITE READY signal indicates successful completion and (2) the reporting of error information via the Attention mechanism signals unsuccessful completion. For such a command, the controller is obliged to time-out on the entire operation as well as the response itself. For all other commands, completion of the exchange signals completion of the operation as well.

Fourth, the drive may not transmit a message to the controller except in response to a command. This is enforced by the controller as it refuses to assert RECEIVER/READY unless it is specifically awaiting a response.

Drive States Relative to the Controller

Figure 5:
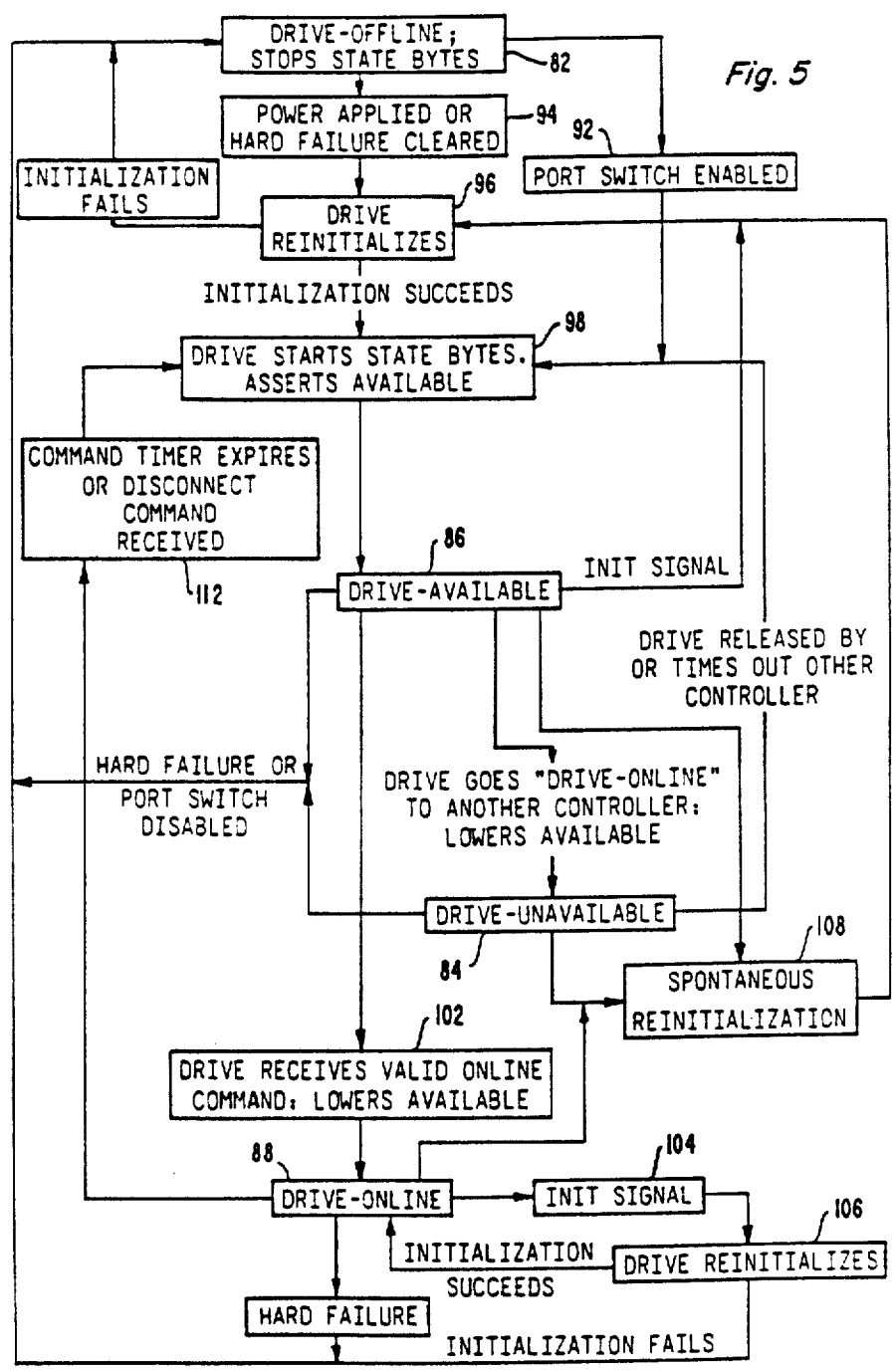
FIG. 5 is a state diagram showing drive states relative to controller, and state changes.

The drive may be in any one of four states relative to the controller. These states differ in the manner in which the drive "listens" to commands and INIT signals through its port to the controller, the manner in which it deals with its panel switches and the extent of controller visibility into and control over drive operation. Referring now to FIG. 5, the description of the drive states and how they are left and entered follows. There are four possible drive control states, designated "drive-offline" (state 82), "drive-unavailable" (state 84), "drive-available" (state 86), and "drive-online" (state 88).

The "drive-offline" state is a state where the controller is not able to communicate with the drive at Level 1 or Level 2. There may or may not be state information transmitted from the drive. A drive enters the "drive-offline" state relative to a particular controller whenever (1) the drive forces itself "drive-offline" due to some catastrophic failure, (2) the drive becomes unavailable to the controller because of a change in the port selection switches, (3) the unit select mechanism is removed, the drive fault display mechanism is activated, or (4) drive power fails.

Assume that a drive is in the "drive-offline" state 82. It may leave that state relative to a particular controller when the port switch or unit select mechanism is enabled, step 92, or when power is applied or a hard failure is cleared, step 94. The clearing of a hard failure or application of power leads to the reinitialization of the drive, step 96. The enabling of the port switch or unit select mechanism causes the drive to start its state bytes and assert AVAILABLE, step 98. This also occurs if the initialization is successful following step 96. Upon assertion of AVAILABLE, the drive enters state 86, drive-available."

A drive that is in the "drive-unavailable" state is one that is visible to the controller, can at times communicate with the controller, but cannot be fully utilized by the controller because it is "drive-online" to another controller. When a "drive-unavailable" drive is unable to communicate at all with the controller, it transmits its state signals to the controller but does not respond to the controller state signals and does not supply any clock for the data lines.

A drive enters the "drive unavailable" state relative to all controllers other than the one to which it is "drive-online" whenever it enters the "drive-online" state. A drive leaves the "drive unavailable" state relative to all controllers other than the one to which it is "drive-online" whenever it leaves the "drive-online" state. As shown in FIG. 5, to reach the "drive-online" state 87, the drive must first be in the "drive-available" state 86 and then receive a valid ONLINE command; at this point it lowers AVAILABLE. That is step 102. Once in the "drive-online" state 87, that state can be reentered in response to an INIT signal, step 104 and a successful drive reinitialization, step 106. Unsuccessful initialization causes reversion to the "drive-offline" state 82. A hard failure, step 108, also causes the state to change from "drive-online" to "drive-offline".

Two further possibilities can take the drive out of the "drive-online" state. First, spontaneous reinitialization, step 108, causes reversion to step 96, which initiates the initialization procedure. Second, expiration of the command timer or receipt on a DISCONNECT command, step 112, causes reversion to step 98.

A drive in the "drive available" state 86 has no evidence that it is not capable of communicating. A drive available" multi-ported drive "listens" to and honors the INIT signal from any port, and also "listens" for a command from any port. A drive in the "drive available" state may or may not have a disc present, spinning, and heads loaded. While in the "drive available" state, the drive responds locally to changes in the drive switch settings and does not report Attention conditions to the controller, but does use the ATTENTION signal to report drive spin-up capability. A drive enters the "drive available" state relative to a particular controller when any of the following occurs:

1. It is in the "drive-offline" state and successfully initializes and has no evidence that it cannot communicate with the controller.

2. It is in the "drive-offline" state because the port is disabled by the panel switches, and the port becomes enabled by a switch change.

3. It is in the "drive-online" state and receives a DISCONNECT command from the controller.

4. It is in the "drive-online" state and concludes that the controller is inoperative because its command timer has expired.

5. It is in the "drive-online" state and spontaneously reinitializes due to any condition which causes the loss of context, such as a transient power failure.

A drive leaves the "drive-available" state relative to a particular controller when any of the following occurs:

1. It receives a valid ONLINE command and goes into the "drive-online" state.

2. It is forced into the "drive-offline" state because its power fails, the port is disabled by panel switch changes, or it detects a failure that prevents communication with the controller.

3. It fails to reinitialize successfully in response to an INIT signal and is forced into the "drive-offline" state.

Whenever a drive is in the "drive-available" state, it notifies the controller that it is "drive-available" by asserting the AVAILABLE signal. While the AVAILABLE signal is being asserted, the drive listens for a command or INIT signal from all enabled controllers. A drive in the "drive-available" state relative to a particular controller is simultaneously in the "drive-available" state to all controllers for which the port switches are enabled. It is "drive-offline" to those controllers for which the port switches are disabled.

A drive in the "drive-online" state is dedicated to the controller to which it is "drive-online" and ignores all controller signals on all other ports. A drive in the "drive-online" state attempts to execute all commands it receives; if it cannot execute a command because its physical status is not appropriate, it responds with an appropriate error code in the status summary section of an UNSUCCESSFUL response.

The receipt of a valid ONLINE command causes the drive to enter the "drive-online" state. Any one of the following will cause a drive to leave the "drive-online" state:

1. The receipt of a DISCONNECT command, which causes the drive to enter the "drive-available" state.

2. The occurrence of a power failure or other failure that prevents further communications, which will force the drive into the "drive-offline" state.

3. Failure to successfully reinitialize in response to an INIT signal, which will force the drive into the "drive-offline" state.

4. The expiration of the command timer, which forces it to conclude that the controller is inoperative and must return to the "drive-available" state.

5. Spontaneous reinitialization due to a condition which causes loss of context.

A drive in the "drive-online" state relative to a controller is simultaneously in the "drive-unavailable" state to all other enabled controllers. A drive in the "drive-online" state does not alter its states in response to changes in the switch settings. Rather, when a drive detects such a switch change, it uses the Attention mechanism to report it to the controller. The controller determines how the drive will respond. The controller will either issue a direct command to effect the status change, or will issue a DISCONNECT command to make the drive enter the "drive-available" state, where it can effect the status change locally. Although the slight time delay is usually not noticeable to the operator who actuated the switch, the controller will delay action on the switch setting change until it has completed all preding operations to the drive.

Use of Attention Signal

A "drive-online" drive uses the ATTENTION signal in four ways:

1. A drive triggers the attention sequence by asserting the ATTENTION signal whenever the command timer expires or one of the generic status bits changes state, except when such change is due to the correct operation of a Level 2 command or an error therein. In response to the ATTENTION signal, the controller initiates a GET STATUS exchange, to determine the drive's new status. By comparing the new status information obtained with previous status information, it determines the nature of the Attention condition. The controller eventually resolves those Attention conditions which require further action by initiating the appropriate exchanges at some later time.

2. Between the time that a drive asserts the ATTENTION signal and the subsequent issuance of a valid GET STATUS command by the controller, the drive considers the controller notified and continues to execute the current command (if any) as best as possible. Further status changes occurring in the drive before the status interrogation arrives are all reflected in the response to the next valid status interrogation command.

3. Upon receipt of a valid GET STATUS command following the assertion of the ATTENTION signal by the drive, the drive lowers the ATTENTION signal and responds with the appropriate response supplying the details of its current status. The ATTENTION signal must be lowered by the drive immediately after the status interrogation command is received and validated, and before the command is processed and a response made. This avoids a condition where a status change occurs during the processing of the current status interrogation and goes undetected.

4. The controller attempts to act on a pending ATTENTION signal as soon as possible. However, the drive can expect to see other unrelated commands in the interval between the issuance of the ATTENTION and the interrogation of status due to condition. During the pendancy of an unserviced Attention condition, the drive attempts to process all commands normally. If the Attention condition was caused by an error, however, the drive refuses subsequent head motion and data transfer commands until a status interrogation is received and the error condition cleared.

Command and Response Timers

The controller employs a response timer to time all drive command and I/O activity. The timeout period is drive specific; it is a parameter peculiar to each disk and is communicated to the controller by the drive. When any frame other than Message Continuation or Message End is ready to be transmitted to the drive, the controller starts the timer and sets its duration according to the specifics of the command and drive. The timer is reset upon receipt of the Message End frame of the response or completion of the data operation. If the timer expires, the controller "assumes" the drive has failed and attempts to resynchronize with it by issuing an INIT signal.

Figure 6:
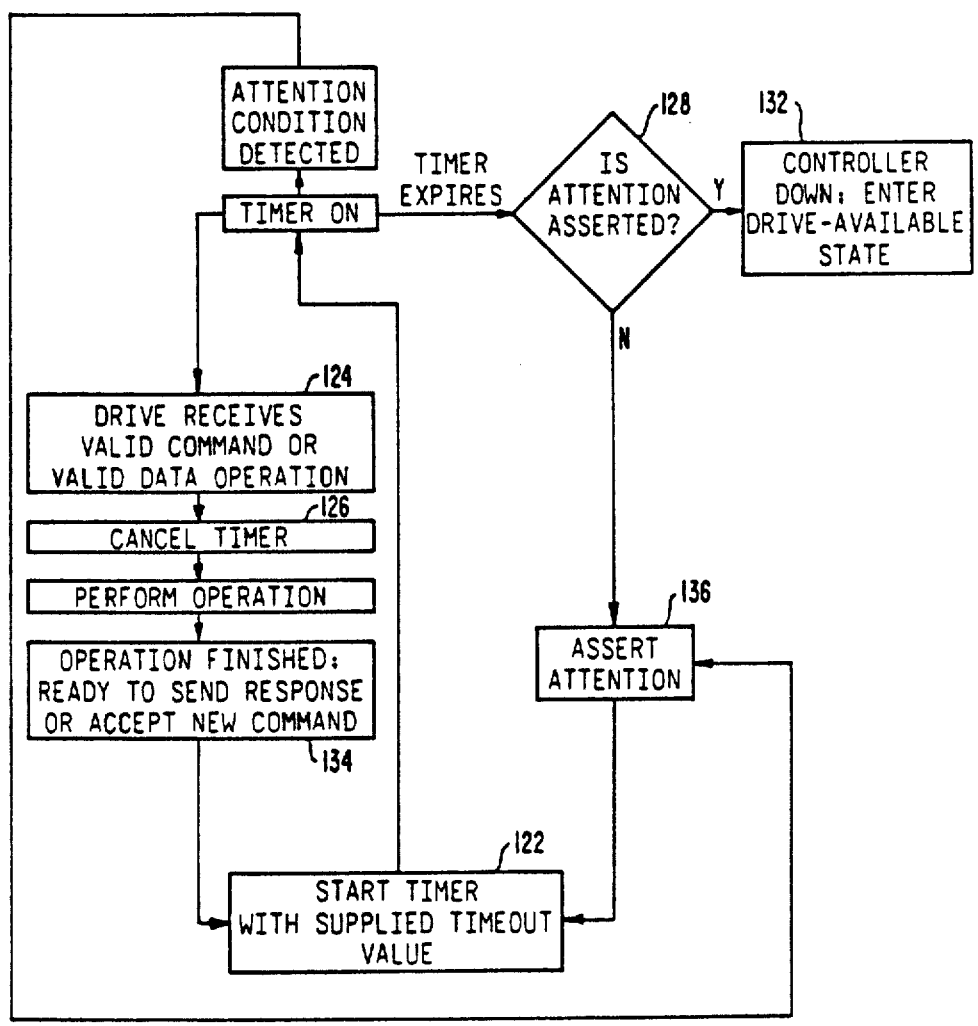
FIG. 6 is a diagrammatic illustration of drive command timer operation.

Correspondingly, a drive in the "drive-online" or "drive-available" state times controller activity. The complete drive command timer operatin is illustrated in FIG. 6. Whenever a "drive-available" drive receives a Message Start frame, it starts a timer. Step 122. A Message End frame from the controller (step 124), causes the timer to be stopped (step 126). If the timer expires while ATTENTION is asserted, (as determined by test step 128) the drive assumes the controller is "inoperative" (step 132). Similarly, a "drive-online" drive starts a timer when the drive is ready to (1) initiate transmission of a Message Start frame of a response (step 134), (2) assert the ATTENTION signal (step 126), or (3) complete a data transfer operation. The timer is cancelled when a Message End frame of a command or a data transfer command is received by the drive (step 124).

Level 0

Figure 7:
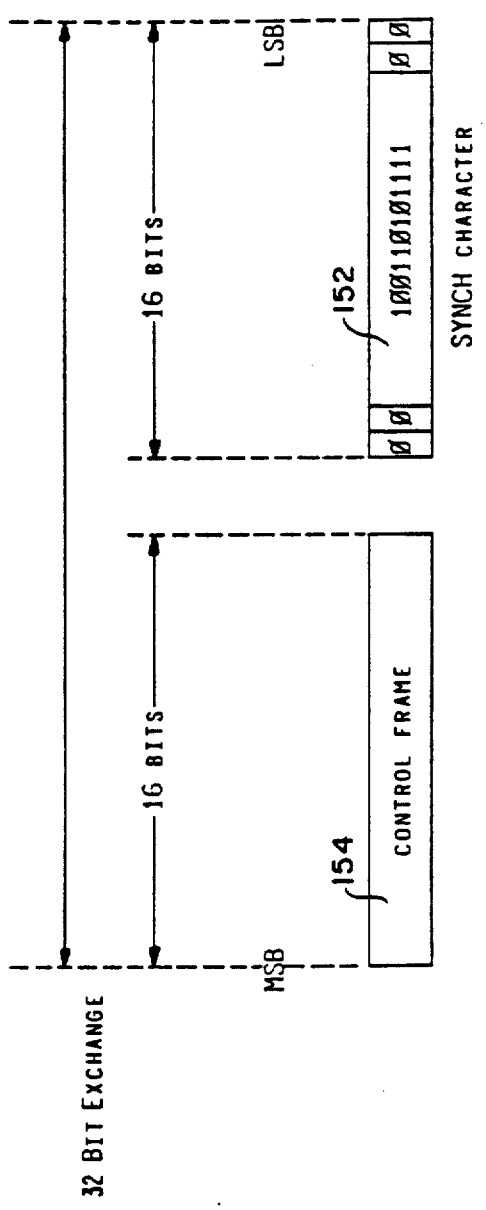
FIG. 7 is an illustration of the format for a Level 0 (i.e., lowest protocol level) control transmission according to the present invention.

The format for each Level 0 control transmission across the cable 10 is illustrated in FIG. 7. As shown there, such transmissions over the RRD and WCD lines use 32 bit transmissions composed of one 16 bit synchronization word, followed by a 16-bit command frame. The synch word, 152, is processed at Level 0 and the command frame, 154, is processed at Level 1. All the 32 bits are transmitted as a single unit, and the initiation of 32-bit transmission is triggered by assertion of the RECEIVE READY signal. The synch word frame 152 starts with two bits of zeroes, followed by a 12-bit synch character and then two more zeroes. The level 1 frame 154 is a 16-bit control frame.

Level 1

FIGS. 8A-8I show the formats of each of the possible Level 1 frames. Each frame is transmitted in a separate 32 bit Level 0 transmission. Receipt of the Message Start frame code 162 (shown in FIG. 8A) in the high order byte of a Level 1 frame 161 indicates the start of a new control protocol message. The low order byte 164 of the transmission is interpreted as the first byte of the message.

Receipt of a Message Continuation frame code 166, as illustrated in FIG. 8B, indicates that the low order byte 168 of the frame 165 is the next byte of the message in progress.

Receipt of the Message End frame code 172 of FIG. 8C indicates that the entire control protocol message has been transmitted and that the checksum is available in the low order byte 174 for frame 171.

The checksum is the one's complement of all message bytes starting with the message data byte of the Message Start frame and ending with a message data byte of the last Message Continuation frame. If the addition operation for any term results in a carry from the high order bit, the checksum is incremented before the next term is added. The checksum is complemented after all addition and increment operations for all terms have been completed. Checksum failure indicates a transmission error when a valid Message End frame was received. Framing codes are not included in the checksum.

Receipt of a SELECT GROUP frame code 176 (see FIG. 8D) outside of an exchange indicates that the drive is to lower READ/WRITE READY, reposition for I/O to the group specified in low order byte 178 of frame 175, and raise READ/WRITE READY when able to perform I/O on the specified group. If the repositioning operation fails, the drive keeps READ/WRITE READY low and reports the problem as a drive error via the Attention mechanism.

Receipt of a SELECT TRACK AND READ code 182 or SELECT TRACK AND WRITE code 188 (see FIGS. 8E and 8F) outside of an exchange indicates that the drive is to select the appropriate track identified in byte 184 or 188 (of frames 181 and 185 respectively) and initiate the specified data operation at the trailing edge of the next sector or index pulse.

Receipt of a SELECT TRACK AND FORMAT ON INDEX code 192 (see FIG. 8G) outside of an exchange indicates that the drive is to select the appropriate track designated in byte 194 of frame 191 and initiate the specified data operation (i.e., format the sector) starting at the trailing edge of the next index pulse, provided that the "FO" status bit is enabled.

Receipt of a FORMAT ON SECTOR OR INDEX code 196 (see FIG. 8H) outside of an exchange indicates that the drive is to use the last selected track and initiate the specified data operation at the trailing edge of the next index or sector pulse provided that the "FO" status bit is enabled. The low order byte 198 of the frame 195 is unspecified.

Receipt of a Diagnostic Echo frame code 202, illustrated in FIG. 8I, outside of an exchange indicates that the drive is to transmit the entire frame (using a diagnostic echo frame code) back to the controller as soon as the controller raises RECEIVER READY. This code is used to establish the integrity of the line and transmission logic. Low order byte 204 is undefined.

Receipt by the drive of a framing code other than the nine specified above is regarded as a transmission error. Receipt by the controller of a framing code other than the Message Start, Message Continue, Message End or Diagnostic Echo is regarded as a transmission error. Receipt of any valid framing code in other than the prescribed order also is regarded as a transmission error. Once a Message Start frame has been transmitted, all frames other than Message Continuation frames are illegal until the Message End frame has been received. Receipt of a frame other than Message Continuation within an exchange is considered a transmission error.

"Transmission errors" are errors detected due to Level 1 mechanisms. If the drive detects a transmission error, it must make certain that READ/WRITE READY remains low (it will have been lowered at the start of frame reception). The drive must then remain RECEIVER READY and receive additional frames until a Message End frame code is received. At that point, the problem is reported with an UNSUCCESSFUL response (using the "RE" error indicator). Depending on the reason for the transmission error, the following cases apply:

1. An error in a Message Start or Message Continue frame will result in the synchronous UNSUCCESSFUL response being triggered by the Message End frame; no reinitialization is necessary.

2. An error in the Message End frame will cause the response timer to expire because the drive will never respond.

3. The garbling of a data transfer or format command will cause the controller to time-out on READ/WRITE READY.

4. The garbling of a frame into a Message End frame will cause the response timer to expire, as both controller and drive will wait for a RECEIVER READY for the other party, and these will never come.

If the controller's Level 1 process detects a transmission error, it must wait for a Message End frame code before initiating recovery procedures. The response timer protects against bad Message End frame codes. The drive does not assert ATTENTION to report transmission errors.

Controller recovery from a transmission error consists of an interrogation of drive status, clearing of any errors, and reissuing the erroneous command. If no Message End frame is received and the response timer expires, the drive must be reinitialized before the recovery process. The controller only makes one attempt to retry a transmission after a transmission error is detected.

The framing codes (i.e., the high-order byte of each frame) provide sufficient information for the receiver to perform optional single bit error correction and double bit error detection.

The minimum number of Level 1 frames transmitted as a result of a single transaction is one frame if the transaction was for a SELECT TRACK AND READ, SELECT TRACK AND WRITE, DIAGNOSTIC ECHO, SELECT GROUP, SELECT TRACK AND FORMAT ON INDEX, or FORMAT ON SECTOR OR INDEX Command. If the transaction was for a message transmission, the minimum transmission is two frames (i.e., a Message Start frame and a Message End Frame). The maximum number of Level 1 frames resulting from a single transaction is 64 frames (i.e., a Message Start frame, 62 Message Continuation frames and a Message End frame).

Figure 9:
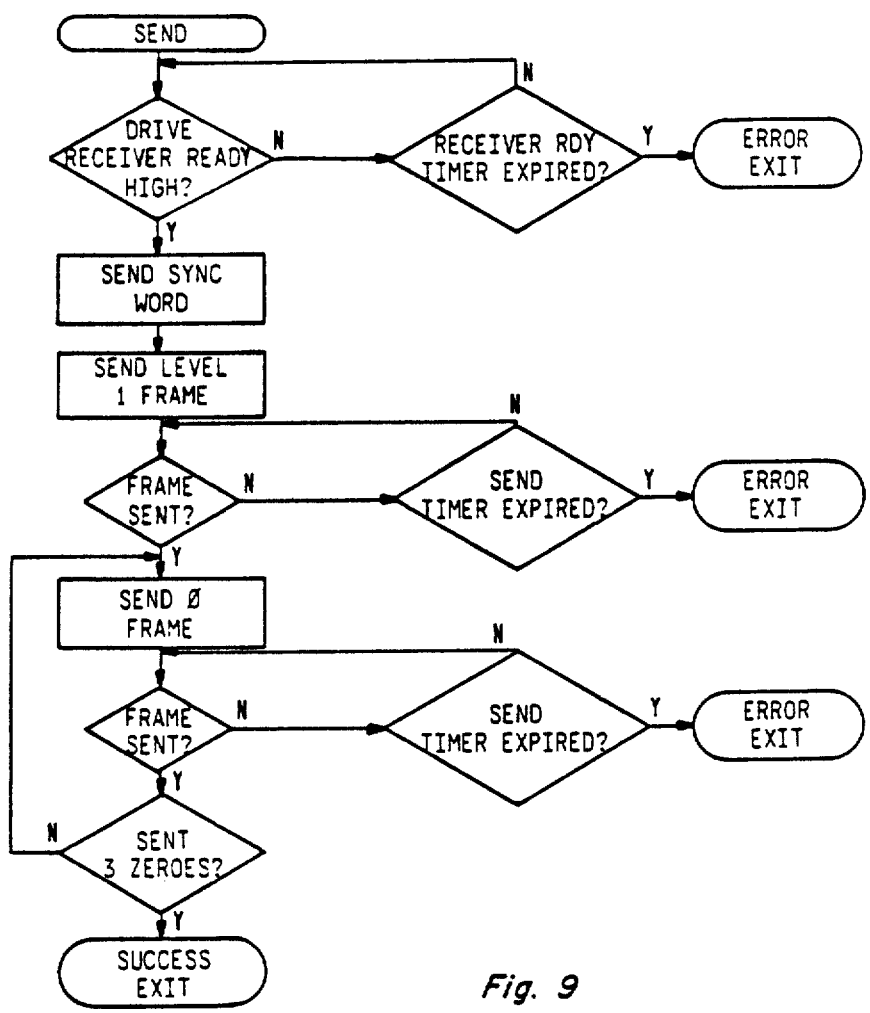
FIG. 9 is a flow chart of the controller's actions for a Level 1 transmission.
Figure 10A:
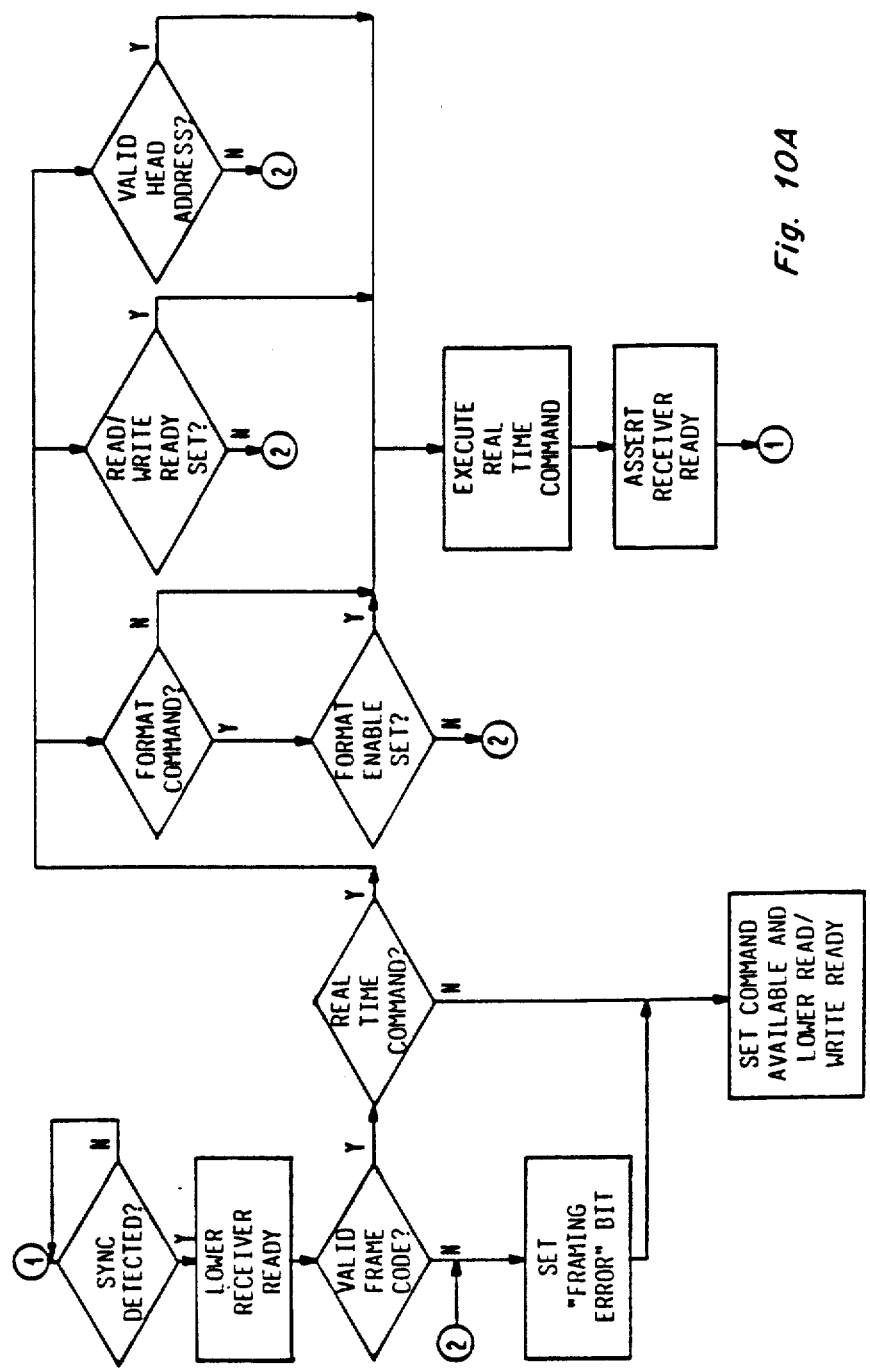
FIGS. 10A–10C are flow charts of the drive's Level 1 receive process.
Figure 10B:
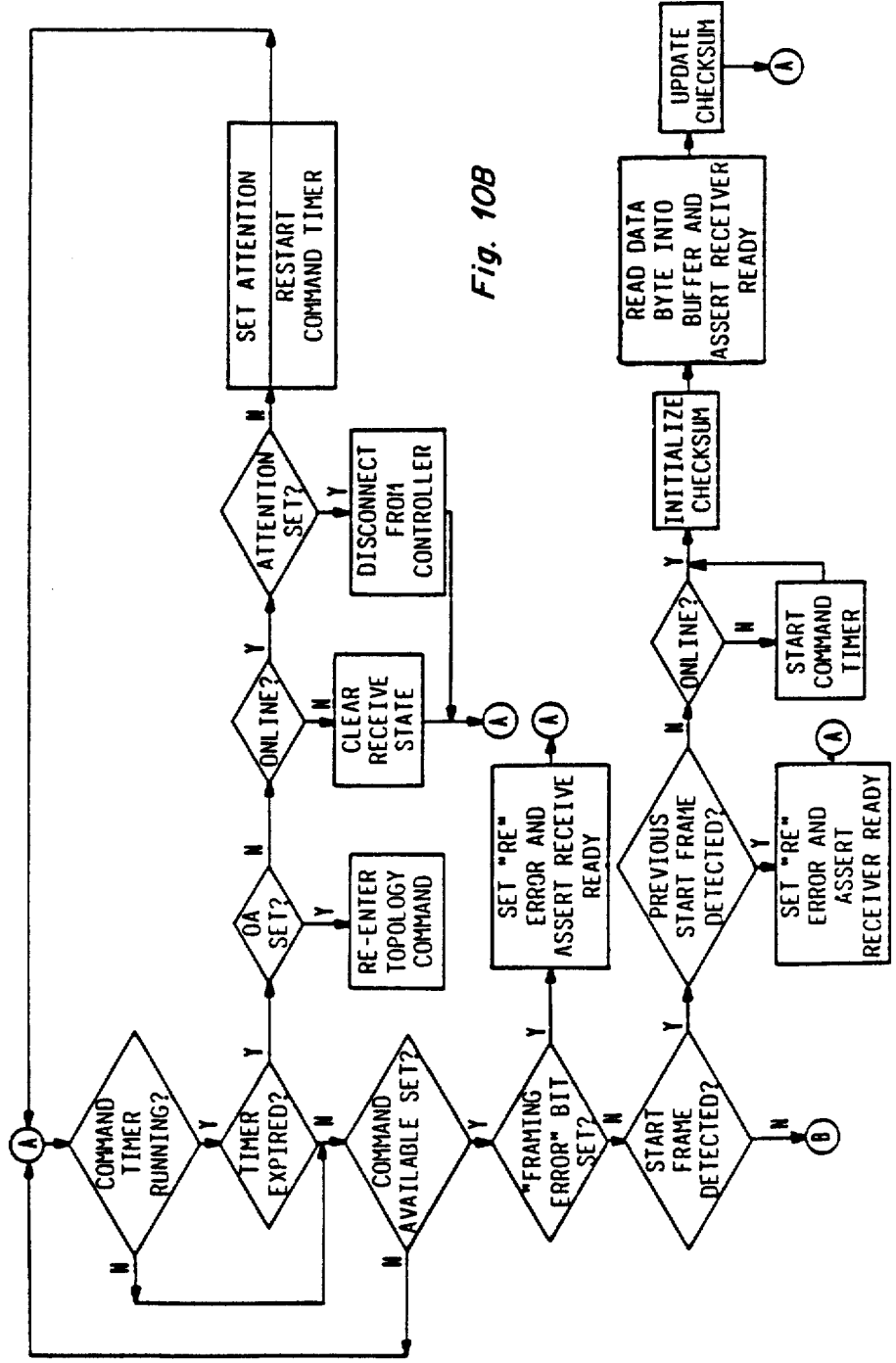
Figure 10C:
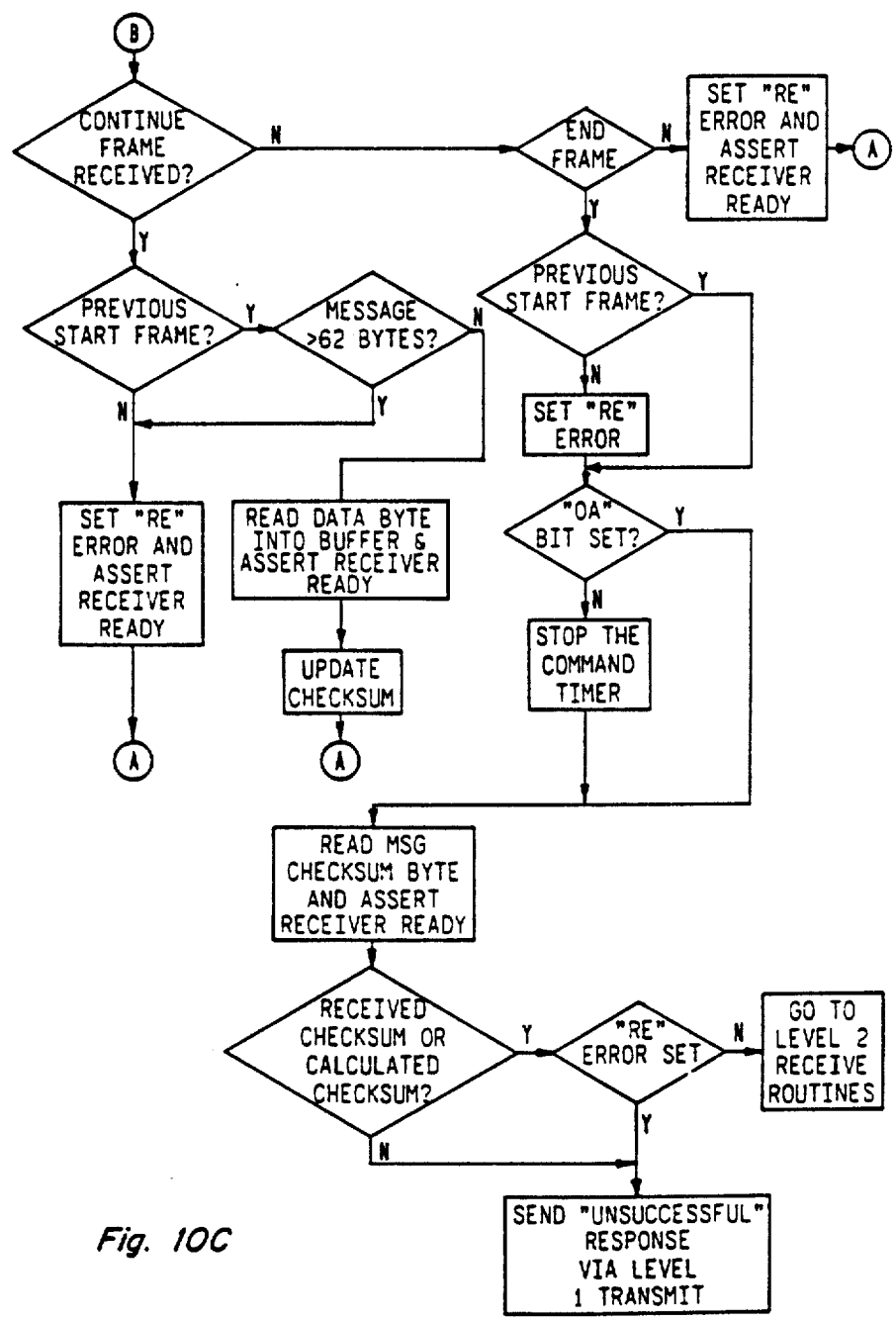
Figure 11:
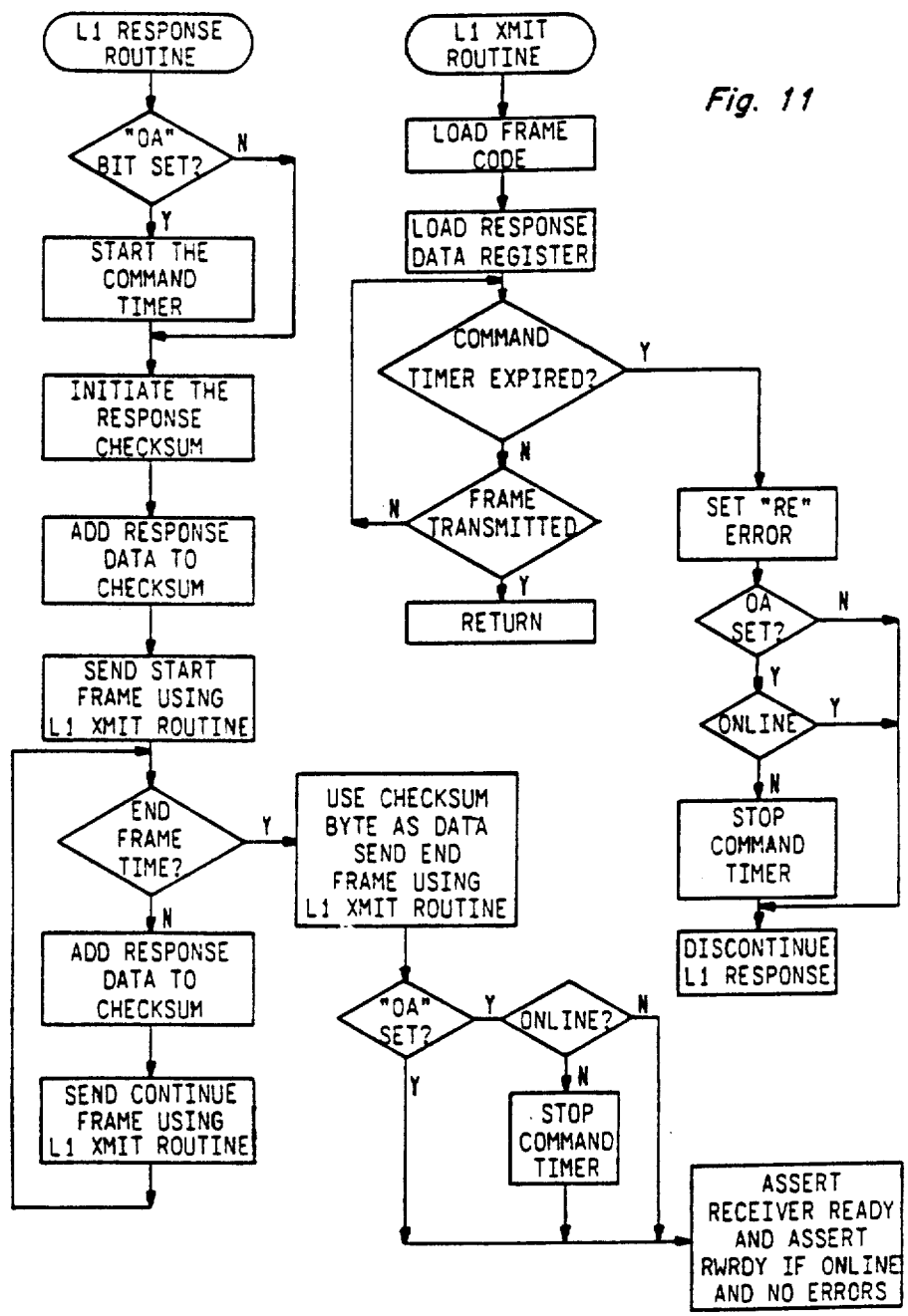
FIG. 11 is a flow chart of the drive's Level 1 transmitting process.
Figure 12:
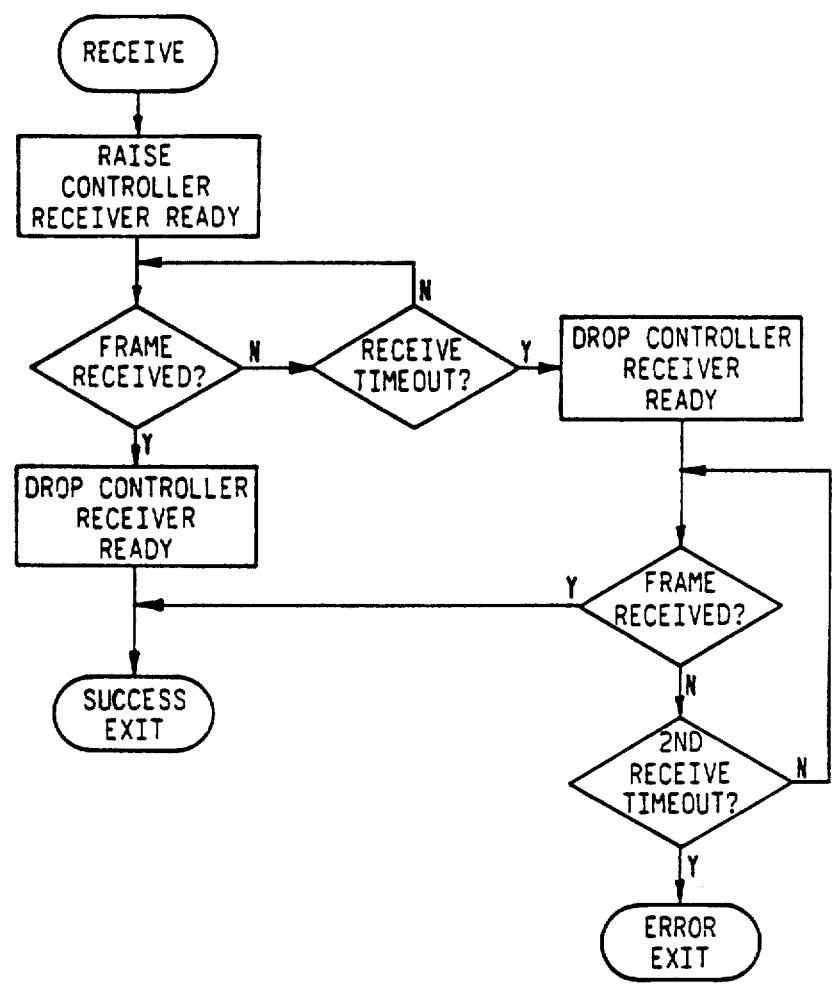
FIG. 12 is a flow chart for the controller's Level 1 reception process.

Flow charts for the processing of Level 1 frames are illustrated in FIGS. 9-12. There, FIG. 9 represents the controller's actions for a Level 1 transmission. Correspondingly, the drive's actions for receiving the transmission are shown in FIG. 10. The drive transmits back to the controller in accordance with FIG. 11 and the controller receives this response as shown in FIG. 12.

Level 2 Transmission

Figure 13:
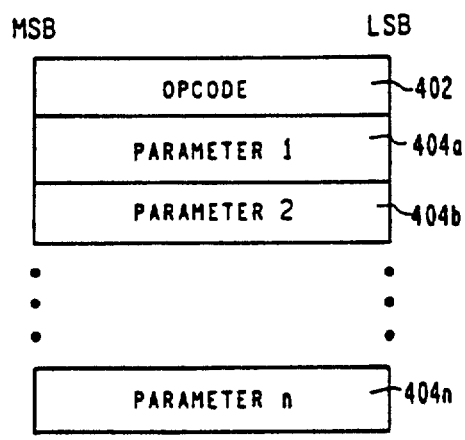
FIG. 13 is a diagrammatic illustration of the format of a Level 2 (i.e., highest protocol level) message.

The format of a Level 2 message is illustrated in FIG. 13. The Level 2 opcode, transmitted in the first byte 402 of a Level 2 message, consists of 7 bits plus a high order even parity bit. Bytes 404a-404n convey the parameters associated with the opcode.

The minimum Level 2 message size is 1 byte i.e., an opcode. The maximum Level 2 message size is 63 bytes. The frame composition has already been stated. The number of parameter bytes in any given message is a function of the message itself. If the message always has a fixed number of parameters, they typically follow the opcode directly. If the message has a variable number of parameters, one of the parameter bytes is used to specify a count of the number of remaining parameter bytes to expect.

Level 2 messages must be validated before they are acted upon; Level 2 information is not processed at all if a transmission error is detected in Level 1. The following conditions are treated as a Level 2 protocol error: an invalid opcode; an invalid or inconsistent parameter or an incorrect number of parameters for the opcode or byte count; and a valid opcode or parameter inconsistent with the drive's current state or physical status.

The drive recovers from a Level 2 protocol error by sending an UNSUCCESSFUL response back to the controller with a protocol error ("PE") indicated in the status summary. Conversely, the controller recovers from a Level 2 protocol error by clearing the error and retrying the command after any necessary correction. Only one retry is attempted.

Figure 14:
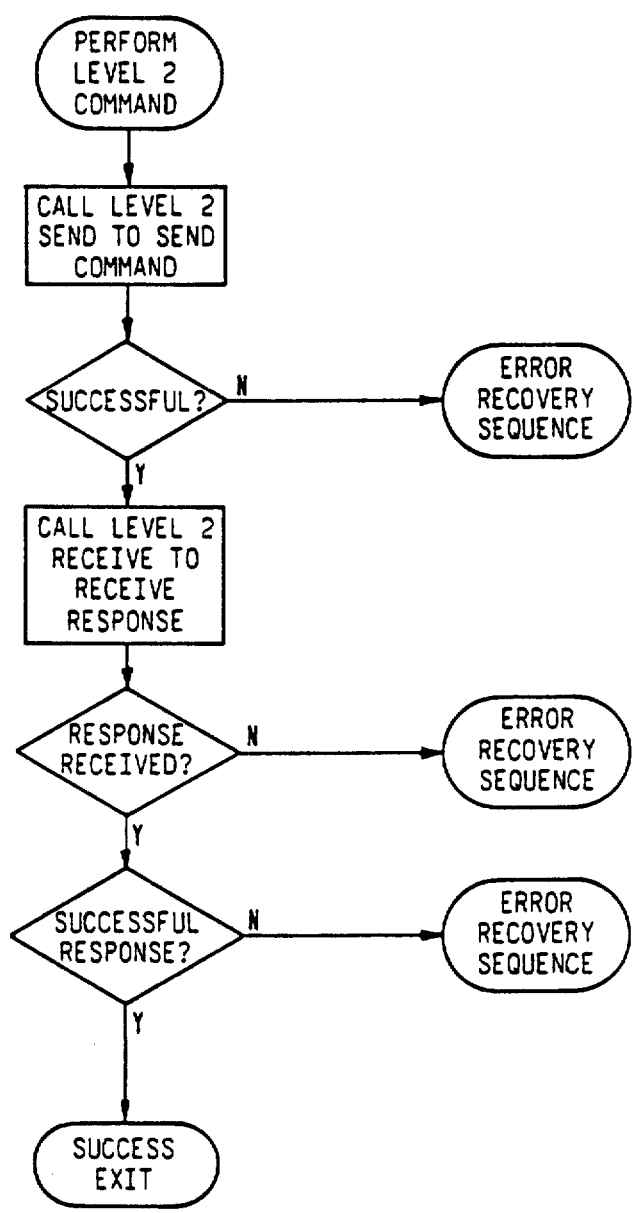
FIG. 14 is a flow chart issustrating a method for performing Level 2 command processing at the controller.
Figure 15:
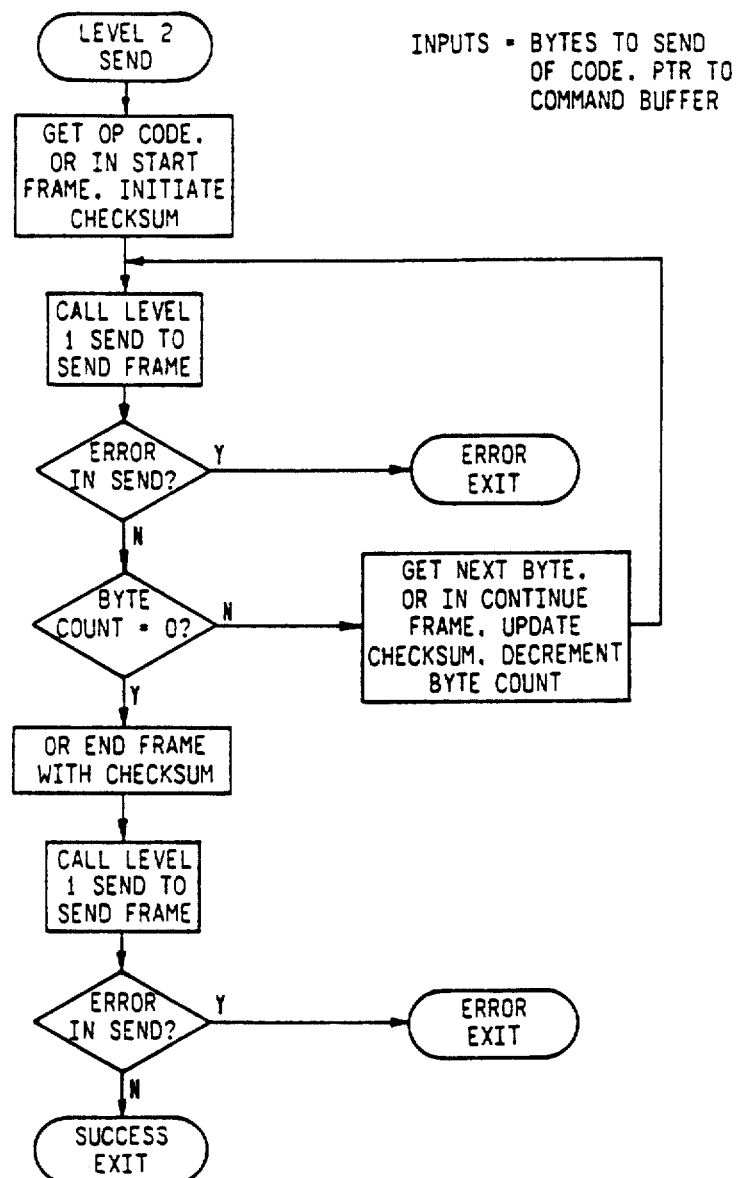
FIG. 15 is a flow chart for the drive and the controller Level 2 message transmission process.
Figure 16:
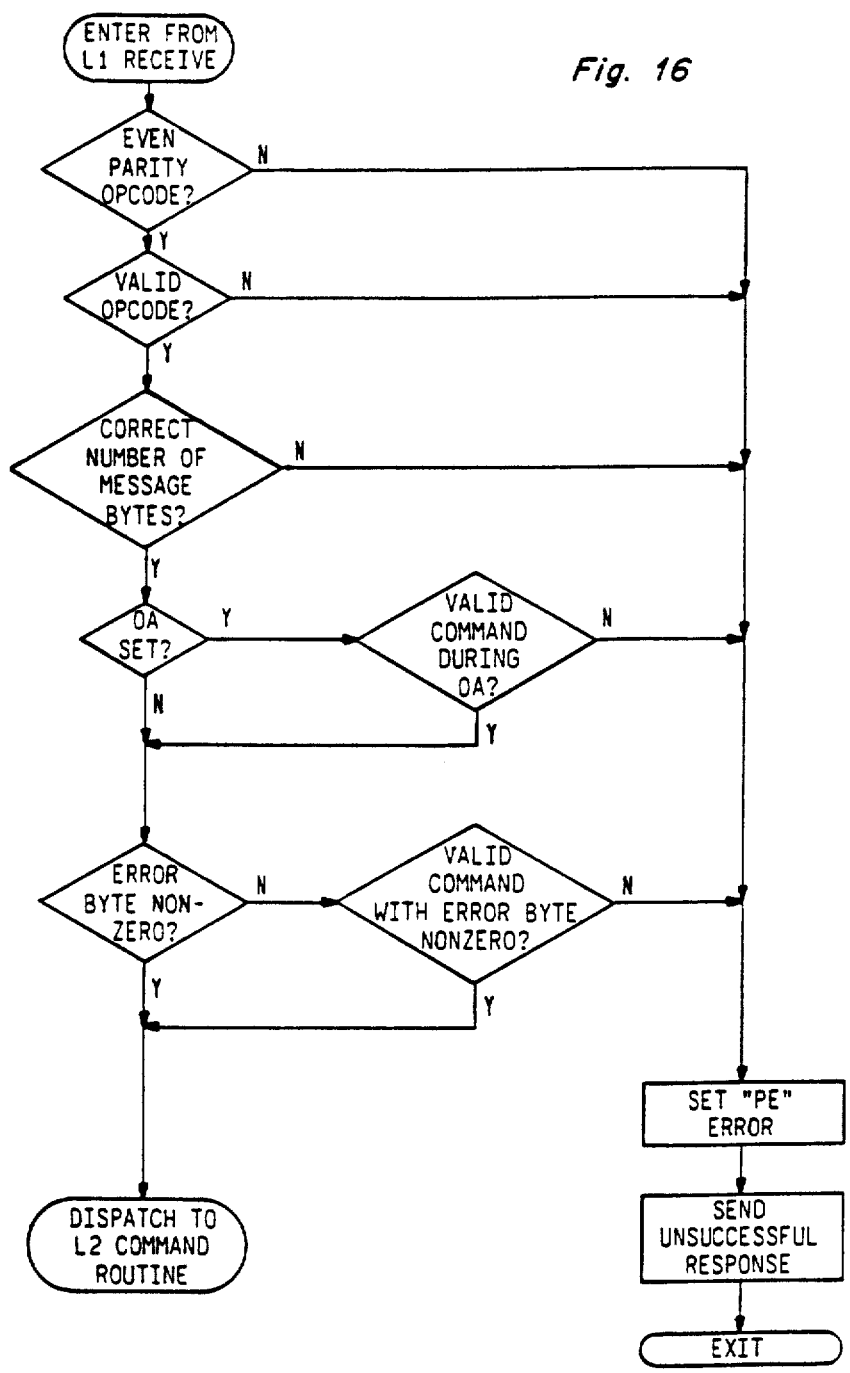
FIG. 16 is a flow chart showing the drive's Level 2 message reception process.
Figure 17:
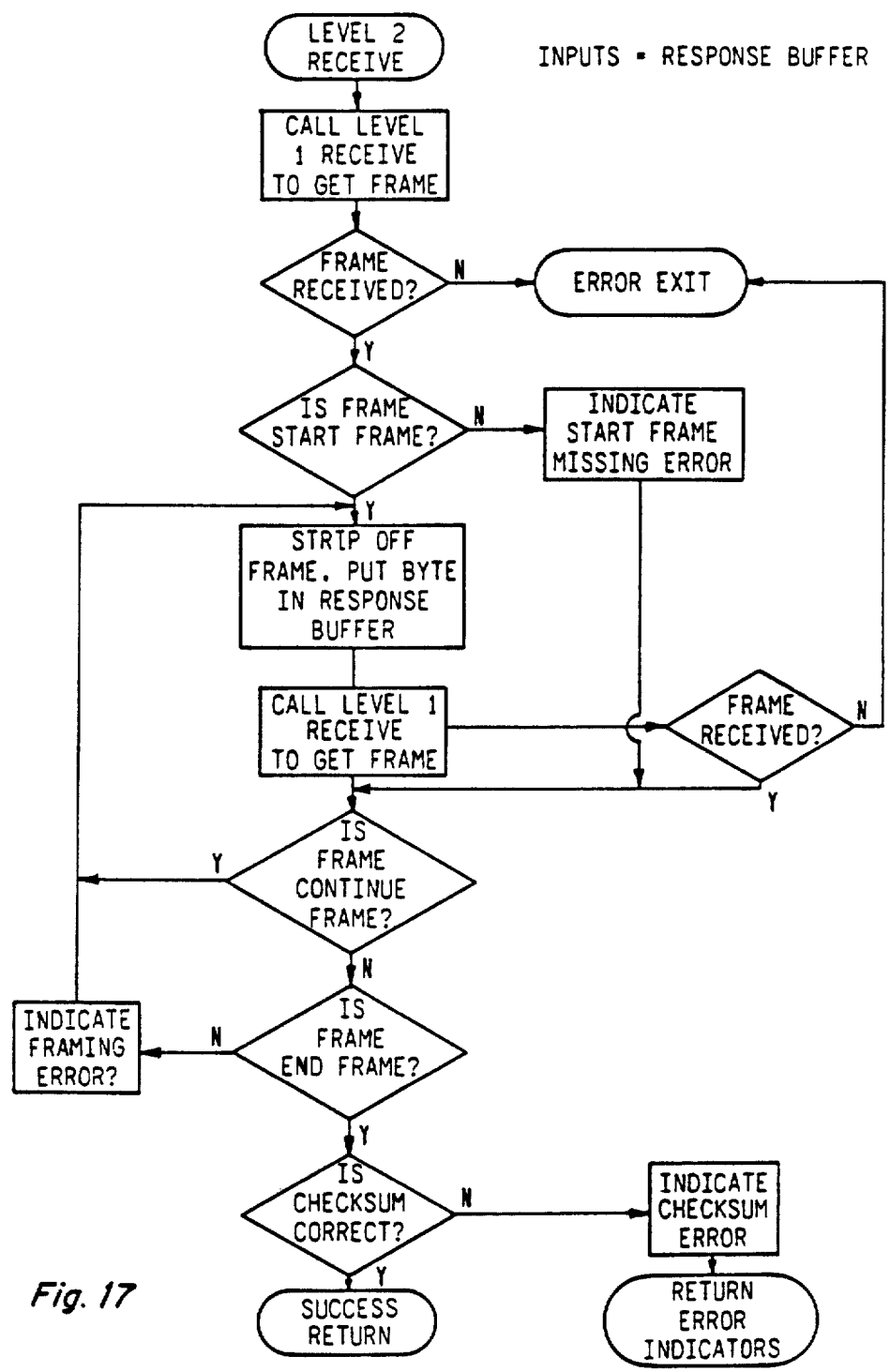
FIG. 17 is a flow chart illustrating the controller's Level 2 message reception process.

All level 2 commands are performed at the controller in accordance with the process of FIG. 14. In turn, this calls the process of FIG. 15 for sending level 2 messages from the controller to the drive; the drive acts on such transmissions as represented in FIG. 16. In turn, the controller actions on receipt of a level 2 response are illustrated in FIG. 17.

In the illustrated embodiment, there are 16 possible controller commands: CHANGE MODE, CHANGE CONTROLLER FLAGS, DIAGNOSE, DISCONNECT, DRIVE CLEAR, ERROR RECOVERY, GET COMMON CHARACTERISTICS, GET SUBUNIT CHARACTERISTICS, GET STATUS, INITIATE SEEK, ONLINE, RUN, READ MEMORY, RECALIBRATE, TOPOLOGY, and WRITE MEMORY. Only certain of these commands are of such interest as to justify detailed commentary.

Figure 20:
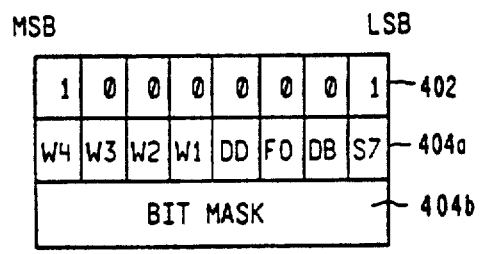
FIG. 20 is a diagrammatic illustration of the format of the CHANGE MODE command.
Figure 18:
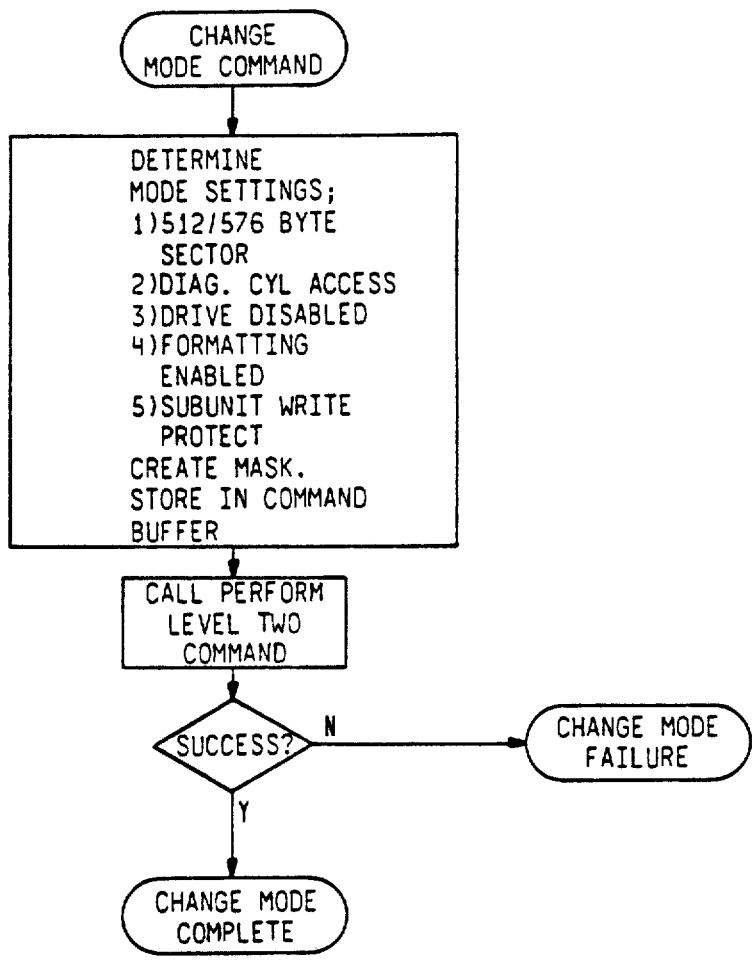
FIG. 18 is a flow chart illustrating the controller's processing of the CHANGE MODE command.
Figure 19:
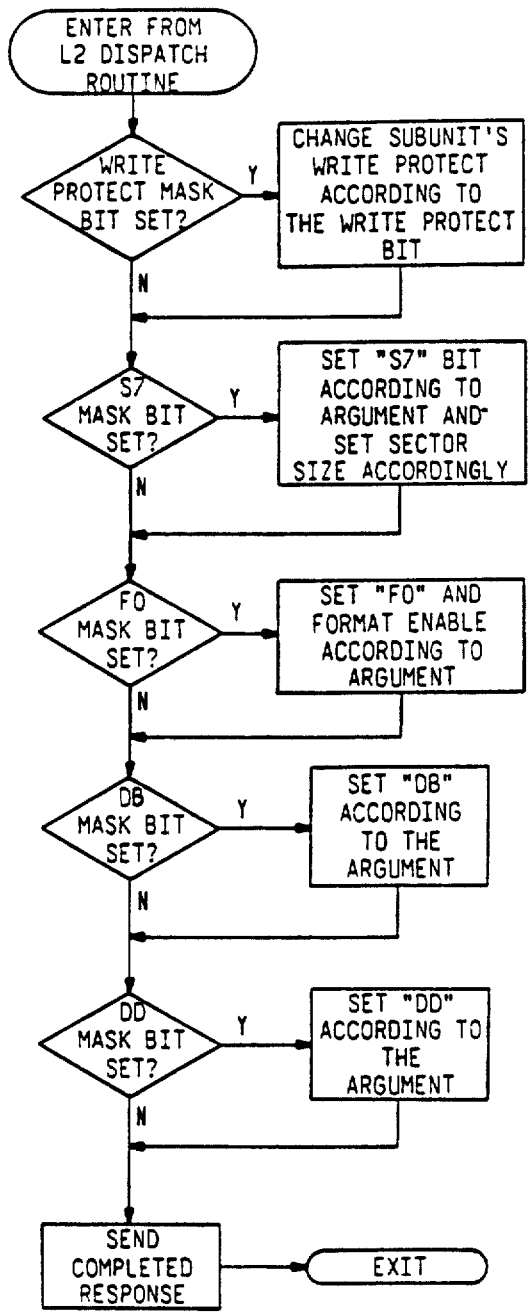
FIG. 19 is a flow chart illustrating the drive's processing of the CHANGE MODE command.

The CHANGE MODE command is processed by the controller as indicated in FIG. 18 and by the drive as shown in FIG. 19. The command's format is shown in FIG. 20. This command instructs the drive to alter its mode to the specified mode settings. The command opcode is contained in byte 404. Byte 404b is a mask for byte 404a; the only bits in byte 404a which are to be acted upon are those for which the corresponding bit in byte 404b is set. The other mode bits remain unchanged.

Mode bits W1-W4 in byte 404a correspond to write-protect flags. If one of these bits is masked and its value is 1, then the corresponding subunit is to be write-protected; if masked but 0-valued, the subunit is to be write-enabled. The request to write-enable a subunit will be refused by the drive unless its write enable/write protect switch is in the write enable position. (Note that a non-multi-unit drive is the equivalent of the degenerate case of a multi-unit drive having only one subunit.)

Acceptable responses are: (1) UNSUCCESSFUL for the indicated reason or (2) COMPLETED, indicating that the drive is now operating with the requested mode settings and write protect status. These responses are universal to Level 2, and are returned to all commands except those for which status information is included in the response.

Figure 21:
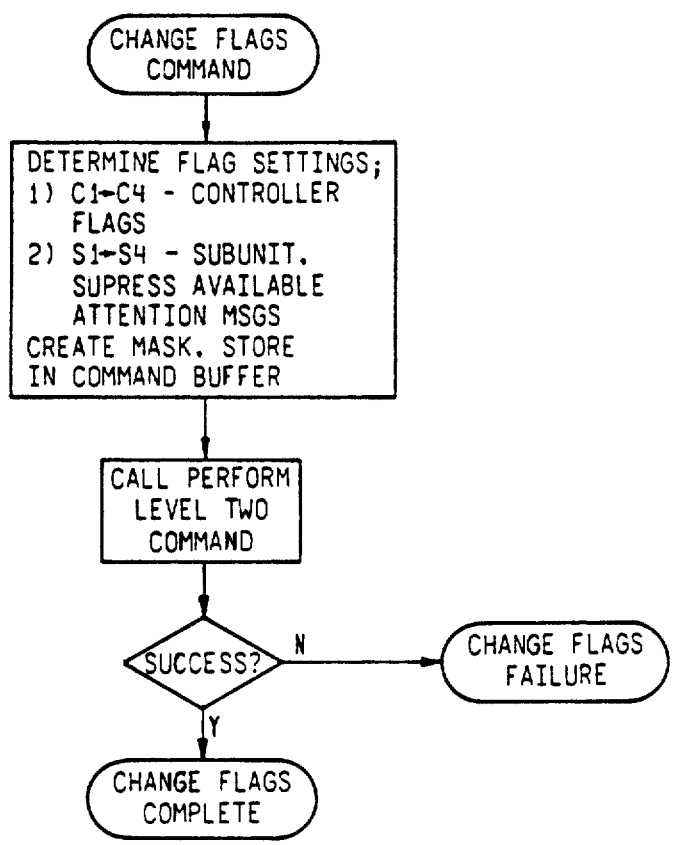
FIG. 21 is a flow chart illustrating the controller's processing of the CHANGE CONTROLLER FLAGS command.
Figure 22:
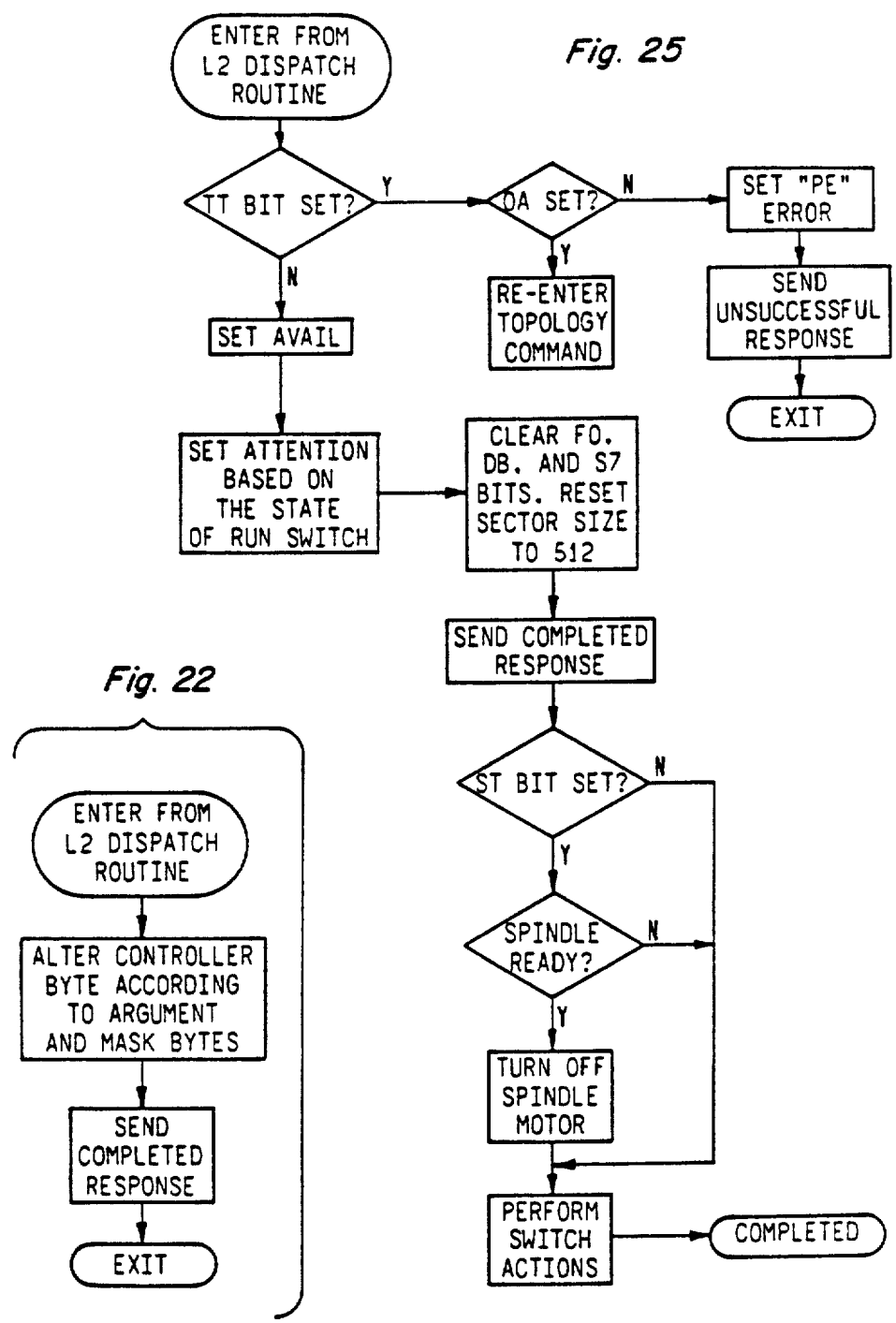
FIG. 22 is a flow chart illustrating the drive's processing of the CHANGE CONTROLLER FLAGS command.
Figure 23:
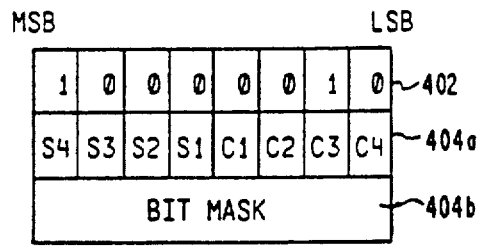
FIG. 23 is an illustration of the format of the CHANGE CONTROLLER FLAGS command.

The CHANGE CONTROLLER FLAGS command is also a three byte command. FIGS. 21 and 22 show the controller and drive processing, respectively, for the command. The format of the command itself is illustrated in FIG. 23. This command directs the drive to change the specified bit(s) in the status "controller byte" to the value(s) supplied. Byte 402 contains the opcode for the command. Byte 404b is a bit mask for byte 404a; the only bits in byte 404a which are to be acted upon are those for which the corresponding bit in byte 404b is set; other bits remain unchanged.

The functionality of the DIAGNOSE command is uninteresting for the present discussion and will be omitted for the sake of clarity.

Figure 26:
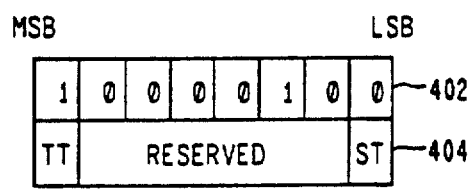
FIG. 26 is an illustration of the format of the DISCONNECT command.
Figure 24:
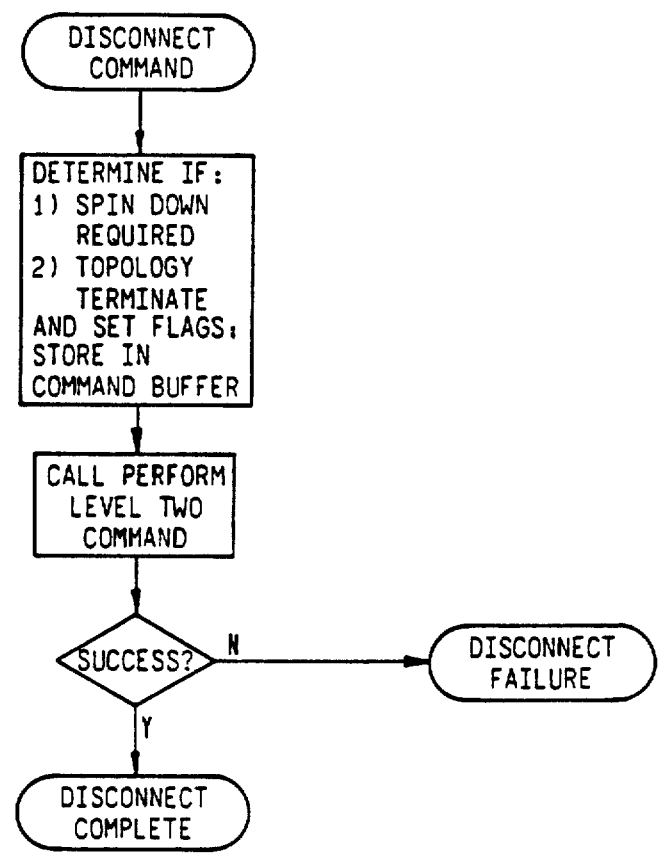
FIG. 24 is a flow chart of the processing of the DISCONNECT command by the controller.

The processing of the DISCONNECT command by the controller and drive, respectively, are illustrated, in FIGS. 24 and 25. The DISCONNECT command directs a "drive-online" drive to enter the "drive-available" state relative to all active ports. The command format is depicted in FIG. 26. There, the command opcode is shown in byte 402. If the "ST" bit in the "modifier byte" 404 of this command is not zero, the drive stops the disk from spinning. If the "ST" bit is zero, the drive does not alter the state of its spindle(s). When spinning the disk, down to an inoperative condition the drive simply initiates the stop operation and waits long enough for the "SR" status bit to become zero before reporting success; it does not wait for the disk to stop. The "TT" bit (i.e., the MSB in byte 404) is used to dismiss the drive and allow it to return to its online port.

The DRIVE CLEAR command is uninteresting for purposes of this discussion, so an explanation of its operation will be omitted in the interest of clarity.

Figure 29:
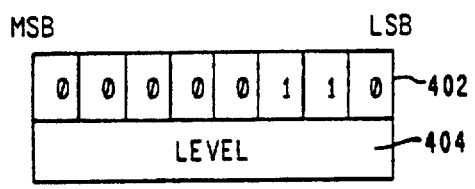
FIG. 29 is an illustration of the format of the ERROR RECOVERY command.
Figure 27:
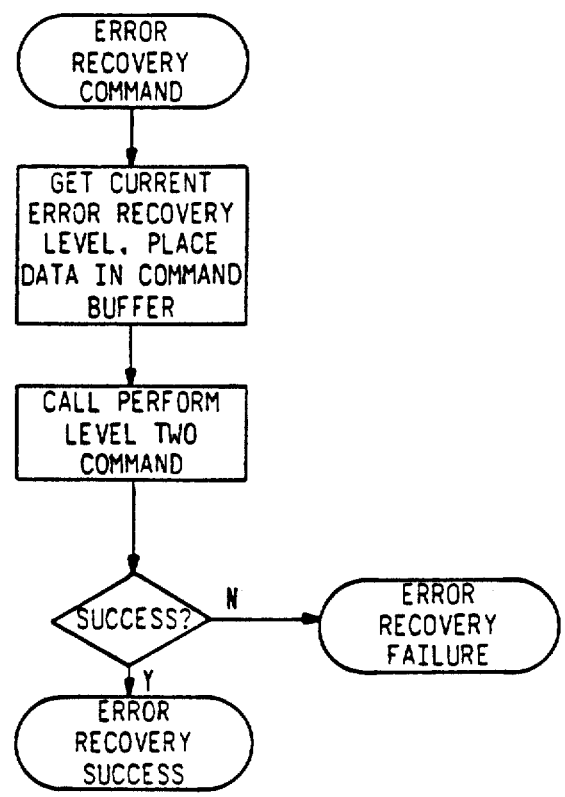
FIG. 27 is a flow chart of the controller's processing of the ERROR RECOVERY command.

The ERROR RECOVERY command is processed by the controller and drive as shown in FIGS. 27 and 28, respectively. This command permits the initiation of drive-specific error recovery mechanisms. While a drive can (and preferably will) have available multiple error recovery mechanisms (i.e., levels), the controller need not know the details of these error recovery techniques, and they can vary from drive to drive. The controller merely identifies a drive's error recovery mechanisms by numbers; for example, the highest numbered mechanism may be the one having the greatest a priori probability of success. The remaining mechanisms then are ordered and numbered sequentially according to decreasing probabilities of success. The controller starts by requesting a drive to use its primary (i.e. highest-numbered) error recovery mechanism; if that fails, the controller next requests the secondary mechanism, tertiary, etc. It is up to drive designers to implement recovery mechanisms appropriate for their particular drives, and to order them for maximum effectiveness. The format of the command is illustrated in FIG. 29. The command's opcode is transmited in byte 402 and the error recovery level is sent in byte 404.

Initially, the drive specifies how many error recovery levels it has, as a drive characteristic returned in the response to the GET COMMON CHARACTERISTICS command. When a data error occurs which cannot be corrected by the error correcting code in use, the controller issues one or more ERROR RECOVERY commands. The highest level is used first and the failed operation is retried after each level. If still unsuccessful, the next level is attempted. This continues until the operation succeeds or all the possible error recovery levels (and mechanisms) have been exhausted.

It should be noted that only the controller knows whether error recovery has been successful, so only the controller can decide whether to go on from one error recovery level to the next. Conversely, the ERROR RECOVERY command is intended only for recovery from data errors detected by the controller. Other errors are dealt with by the drive or by retry of other commands.

Figure 30:
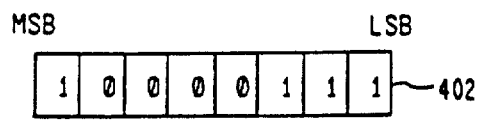
FIG. 30 is an illustration of the format of the GET COMMON CHARACTERISTICS command.
Figure 31:
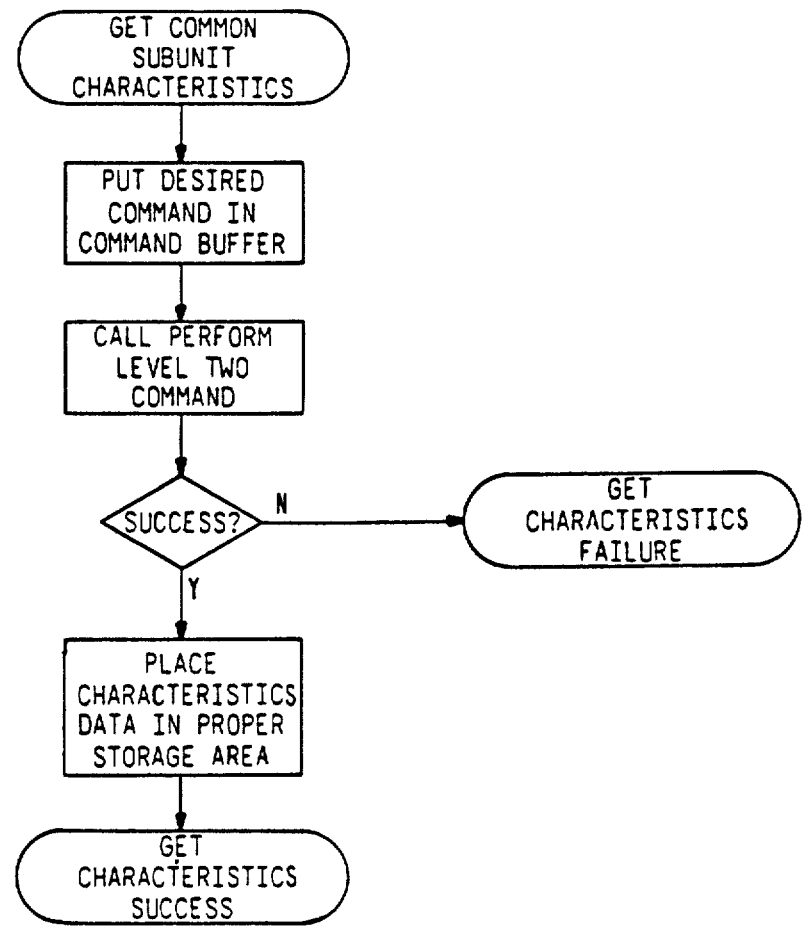
FIG. 31 is a flow chart of the controller's processing of the GET COMMON CHARACTERISTICS command.

The GET COMMON CHARACTERISTICS command is a one byte command having the format indicated in the one byte 402 of FIG. 30. It is processed by the controller as shown in FIG. 31 and by the drive as shown in FIG. 32. This command requests the drive to send to the controller a description of the characteristics common to all subunits of the drive.

Upon completion of the exchange, the drive state is unchanged relative to all controllers. This command is valid when the status "error byte" is non-zero and validly pertains to all "drive-unavailable" drives.

Acceptable responses to the GET COMMON CHARACTERISTICS command are: (1) UNSUCCESSFUL, for the indicated reason and (2) a GET COMMON CHARACTERISTICS response of the format indicated in FIG. 33.

Figure 33:
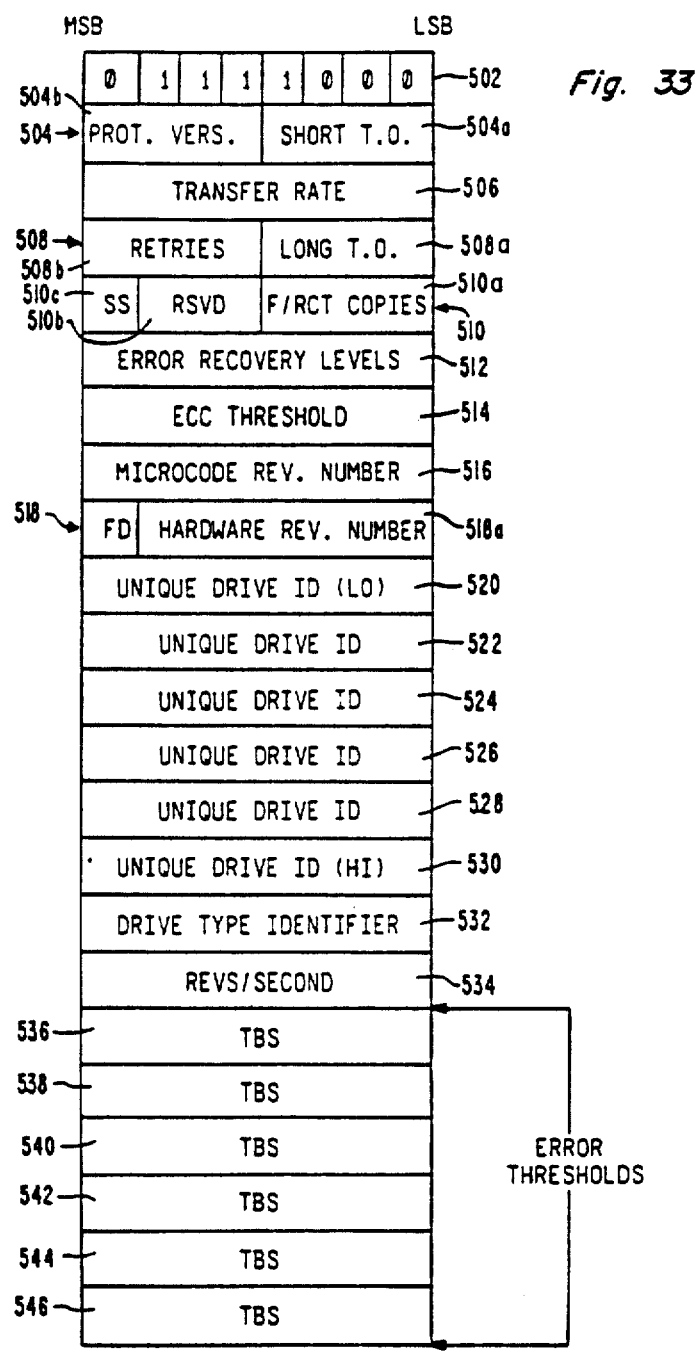
FIG. 33 is an illustration of the format of the GET COMMON CHARACTERISTICS response.

As shown in FIG. 33, the GET COMMON CHARACTERISTICS response involves a 23 byte sequence. The first byte 502 indicates the nature of the response and may, for example, be coded as indicated in the figure. The lower half 504a of the second byte 504 contains a "short time-out" count (expressed as a power of 2) representing the time to be used for timing out the worse case operation excluding DIAGNOSE, RUN, and RECALIBRATE. This time should include that necessary for drive-controlled retries. The upper half 504b of the second byte 504 signifies the version of the communications protocol employed by the drive, to ensure controller and drive compatibility. The third byte 506 contains a number proportional to the drive's transfer rate. The lower half 508a of the fourth byte 508 contains a long time-out, which is the time used for DIAGNOSE, RUN and RECALIBRATE operations. The time out appropriate for the longest of these is supplied. The "retries" entry in the upper half 508b of byte 508 indicates the number of times the controller should retry the data transfer operation before giving up. (All non-data transfer errors, of course, are retried only once.)

The next byte, 510, is also subdivided, but this time into three parts. The lower half 510a of byte 510 contains information as to the number of copies of the format and revector control tables maintained in the drive. (For a more complete discussion of the format and revector control tables, see the above-identified application for Disk Format for Secondary Storage System.) The next three bits 510b are reserved. The uppermost bit 510c contains sector size information. For example, it may contain a zero if the drive employs 512 byte sectors only and a one if it employs 576 byte sectors (or 576 byte sectors of which only 512 bytes are used).

Byte 510 contains the number of error recovery levels available in the drive.

Byte 514 contains a number representing the number of symbols in error considered serious enough to initiate a revectoring operation. Thus, if this threshold is exceeded for a particular sector, then as a preventive measure, that sector is replaced by a spare sector reserved for that purpose; the data is rewritten in that spare sector so as not to lose data when the sector degrades to a point that the error correcting code can no longer restore it. Subsequent accesses to the bad sector are redirected to its replacement sector.

Byte 516 contains an indication of the microcode revision to which the drive is current.

Byte 518 is subdivided so that the lower 7 bits 518a include a hardware revision number.

Bytes 520-530 contain a unique drive identifier, or serial number, each drive having its own unique numbering in these bytes.

Byte 532 contains a drive type identifier.

Byte 534 contains a number representing the rotational speed of the disk (in revolutions per second) and bytes 536-546 contain error threshold information.

Figure 34:
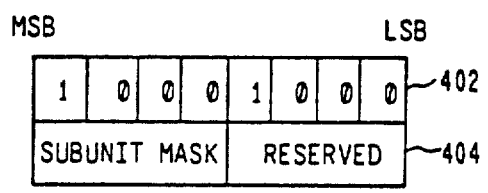
FIG. 34 is an illustration of the format of the GET SUBUNIT CHARACTERISTICS command.
Figure 35:
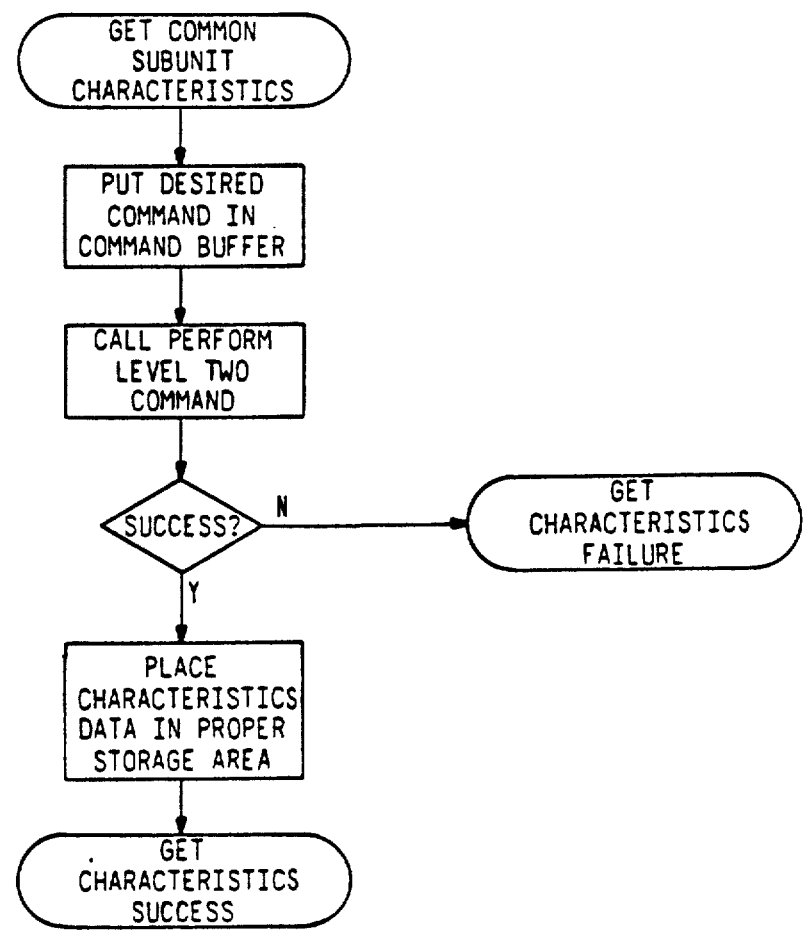
FIG. 35 is a flow chart of the controller's processing of the GET SUBUNIT CHARACTERISTICS command.

The GET SUBUNIT CHARACTERISTICS command is a two byte command having the format illustrated in FIG. 34. Byte 402 is the opcode and byte 404 contains a subunit mask in its upper half. The controller and drive processing of the command are shown in FIGS. 35 and 36, respectively. Its function is to request the drive to send the controller a description of the geometrical characteristics of the subunit specified in the subunitmask. This mask which must have exactly one bit set in it; that bit must also be one of the bits set in the subunit mask returned by the GET COMMON CHARACTERISTICS command.

Figure 37A:
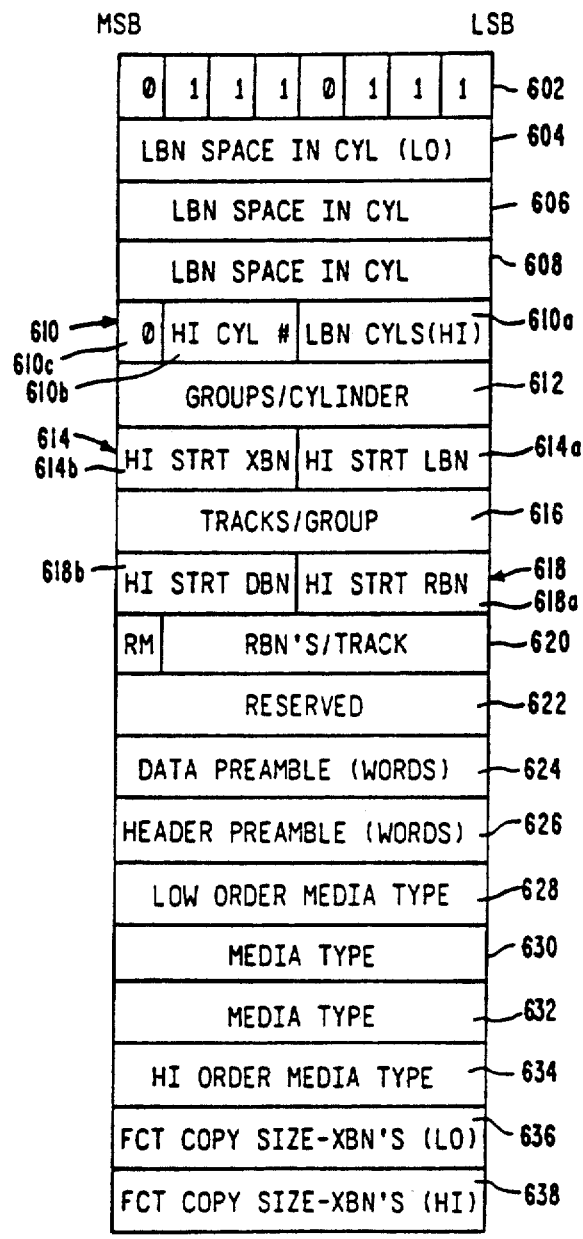
FIGS. 37A and 37B, together, are an illustration of the format of the GET SUBUNIT CHARACTERISTICS response.
Figure 37B:
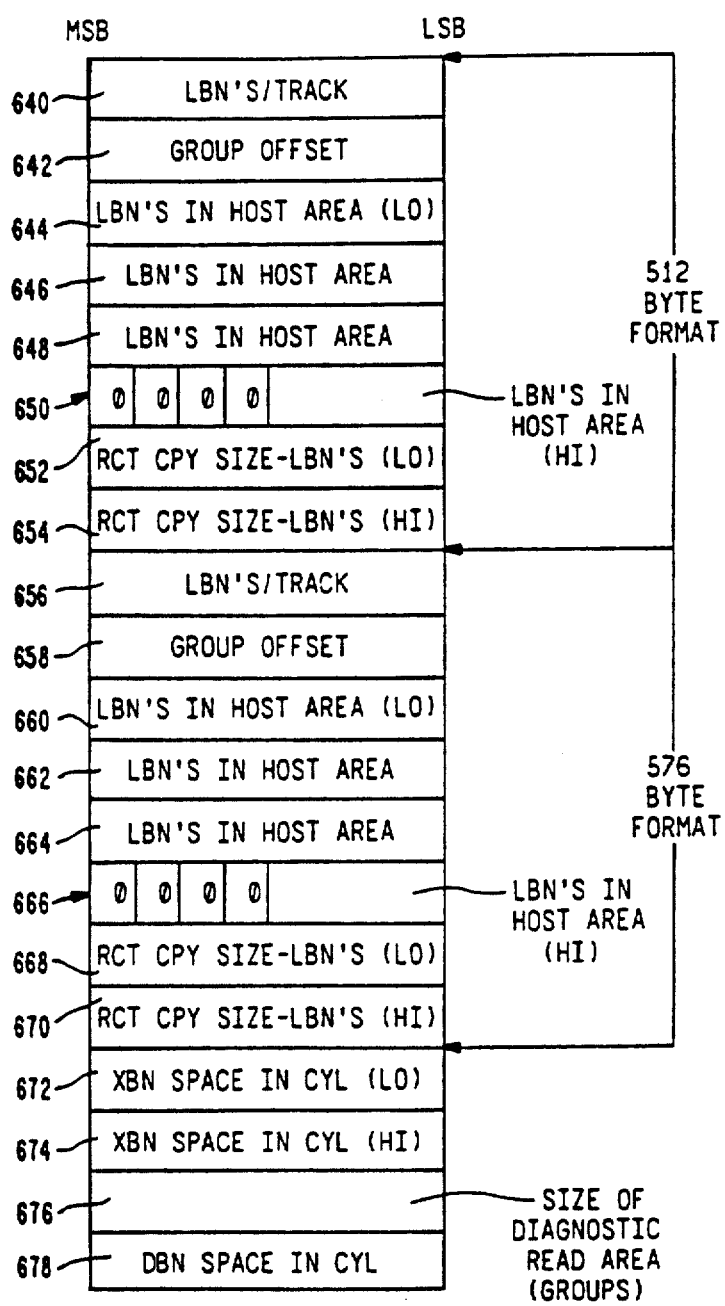

Acceptable responses to the GET SUBUNIT CHARACTERISTICS command are either UNSUCCESSFUL for the indicated reason or else have the 39 byte format of FIGS. 37A and 37B.

The first byte 602 of the response format in FIGS. 37A and 37B is preselected as having a fixed pattern, such as the one illustrated. Bytes 604-608, and the lower half 610a of byte 610 indicate the size of the subunit's LBN space, in cylinders. The next three bits 610b in byte 610 represent the number of the highest cylinder. MSB 610c is always zero. Byte 612 contains the number of groups per cylinder; byte 616, the number of tracks per group. The LBN space starts at the address signified by the lower half 614a of byte 614, which gives the address of the higher-order half of the starting LBN entry. The starting addresses for the XBN, RBN and DBN spaces are similarly specified in the upper half 614b of byte 614 and the lower and upper halves 618a and 618b of byte 618, respectively.

Byte 620 contains seven bits signifying the number of replacement blocks (i.e., RBN's) per track and an eighth bit which is not germane to this discussion. As indicated, there is no present function assigned to byte 622; it is "reserved" for use when an extra byte is needed.

The sizes of the data and header preambles (in words) are provided in bytes 624 and 626, respectively. Media type is specified in bytes 628-634; this indication may refer, for example, to a manufacturer's drive types. Bytes 636 and 638 contain an indication of the size of a copy of the format control table (FCT).

Where a disk drive may employ one of two byte-per-sector formats, the subunit characteristics response contains a first group of bytes (e.g., bytes 640-654) which are used only when the drive utilizes a first byte/sector format, and a second group of bytes (e.g., bytes 656-670) which are used only when the drive employs a second byte/sector format. These formats may, for example, be 512 and 576 bytes/sector, respectively. Byte 640 or 656, as the case may be, provides the number of LBN's per track. The group offset for spiral reading is indicated in byte 642 or 658. The contents of bytes 644-650 (lower half) or 660-666 (lower half) is the number of LBN's in the host applications area—i.e., the size of the memory presented to the host for applications use. Bytes 652 and 654 or 668 and 670 signify the size of one copy of the RCT, in LBN's.

The size of XBN space, in cylinders, is indicated in bytes 672 and 674. Byte 676 contains the size of the diagnostic read area, in groups. And byte 678 represents the size of the DBN space, in cylinders.

Figure 38:
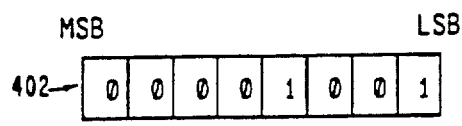
FIG. 38 is an illustration of the format of the GET STATUS command.
Figure 39:
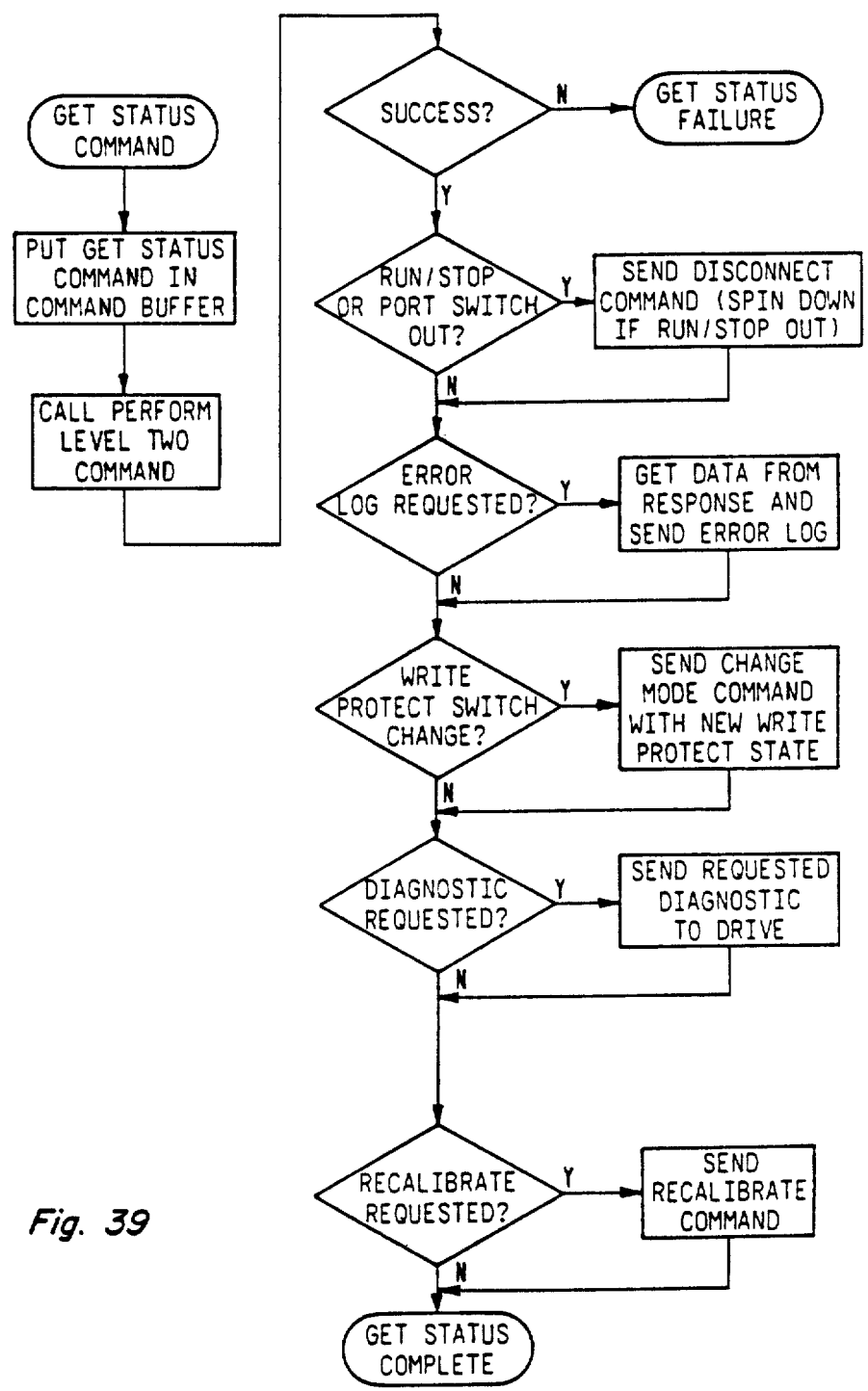
FIG. 39 is a flow chart of the controller's processing of the GET STATUS command.
Figure 40:
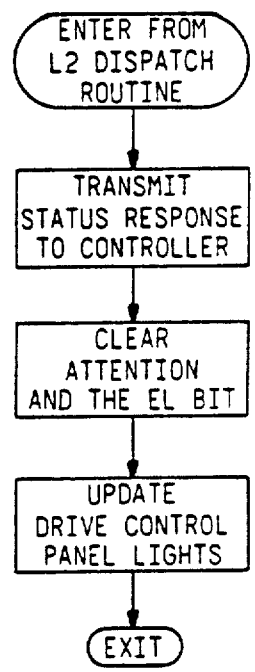
FIG. 40 is a flow chart of the drive's processing of the GET STATUS command.

The GET STATUS command is a one byte command having the format illustrated in FIG. 38. It is processed by the controller as depicted in FIG. 39, and by the drive as depicted in FIG. 40. This command is used to request that the drive send its current status to the controller. Upon completion and validation of the command, a "drive-online" drive lowers the ATTENTION signal if it had been asserted.

Two possible responses may be provided: (1) UNSUCCESSFUL, for the indicated reason, and (2) a status response of the format shown in FIG. 41.

Figure 41:
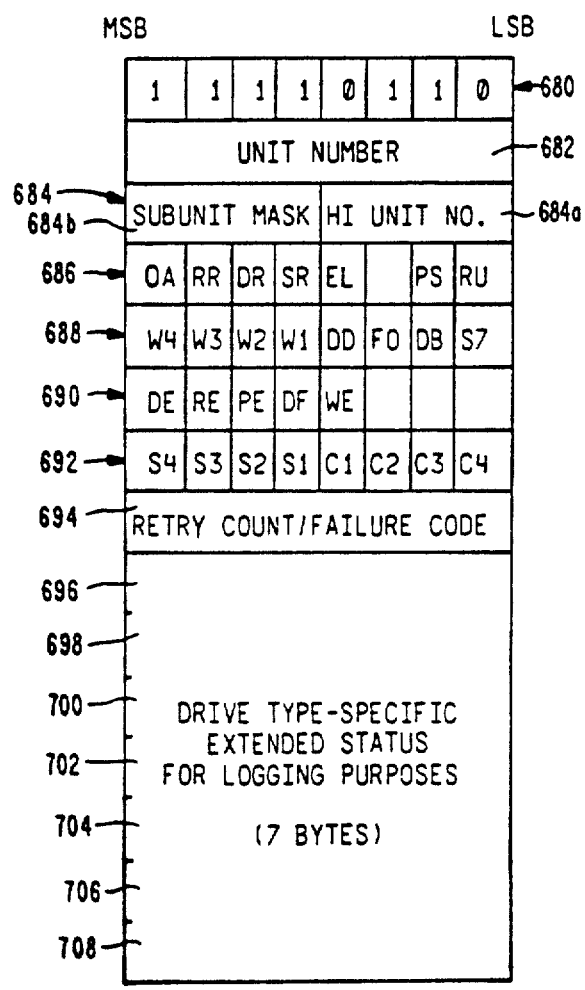
FIG. 41 is an illustration of the format of the response to the GET STATUS command.

In FIG. 41, byte 682 contains the eight lower bits of a 12- bit unit number. The rest of the unit number is contained in the four lower bits 684a of byte 684. The four upper bits 684b of byte 684 contain a subunit mask.

Bytes 486-690 contain the "generic status bits".

More particularly, byte 686 is a "request" byte. The least significant bit "RU" in byte 686 indicates the status of the RUN/STOP switch; it may be zero if the switch is out and one if the switch is in, for example. The next lower bit, "PS", indicates the status of the port switch; it may be zero if the switch is out, and one if the switch is in. The fourth bit, "EL", indicates whether bytes 696-708 contain useful information; a "1" represents an affirmative statement. The fifth bit, "SR" indicates whether the spindle is ready; for example, if the bit is zero, the spindle is not ready and is not up to speed, and if it is one, the spindle is ready. The next bit, "DR", indicates whether diagnostics are requested. The next, "RR", bit signals whether time is requested for doing internal operations. And the most significant bit, "OA", indicates drive state; if zero, the drive is "drive-online" or "drive-available" to the controller, whereas if it is a one, the drive is "drive-unavailable" to the controller (it may, of course, be "drive-online" to another controller.

Byte 688 is the "mode byte". The least significant bit of this byte, "S7", signals sector format. The controller may, for example, operate with drives employing either 512 byte sector format or 576 byte sector format. The "S7" bit signals the controller as to the format employed by the drive. The second bit in this diagnostic cylinder byte is the "DB" bit, which signals whether external access is disabled or enabled. The third bit in the mode byte is the "FO" bit, which signals whether formating operations are disabled or enabled.

The "DD" bit, which comes next, indicates a drive enabled/disabled condition; it is zero when the drive is enabled by a controller error routine or diagnostic and one if the drive is disabled by a controller error routine or diagnostic. Bits W1-W4 signal whether the write protect switch is in or out for the subunit associated with each bit. (Note that it is customary in the art to use "write protect" circuitry to prevent unintended writing over data to be preserved.)

Byte 690 is an "error byte." Its first three low-order bits are blank. The fourth bit, "WE," is a write-lock error flag, which is a one in the event of an attempt to write to the drive while it is write-locked. The next bit, "DF," signals an initialization diagnostic failure. The sixth bit of byte, "PE," signals a Level 2 protocol error. The next bit, "RE," signals a transmission error. The most significant bit in the byte, "DE," signals a drive error.

All bits in the error byte are set by the drive as appropriate and are cleared by the controller via a DRIVE CLEAR command.

Byte 692 is termed the "controller byte." All bits in the controller byte are ignored by the drive except that they are changed by the CHANGE CONTROLLER FLAGS command and cleared by the drive under the appropriate state conditions. The C flags (Cn) and the S flags (Sn) are cleared whenever the drive is "drive-off line" to all controllers. All bits in the controller byte are preserved a cross an INIT operation.

Byte 694 contains a count of the number of retries, or a failure code.

Bytes 696-708 contain drive type-specific extended status for logging purposes. The subunit mask defines how many subunits are present in the drive. The subunits are identified as bit positions in the mask.

Figure 44:
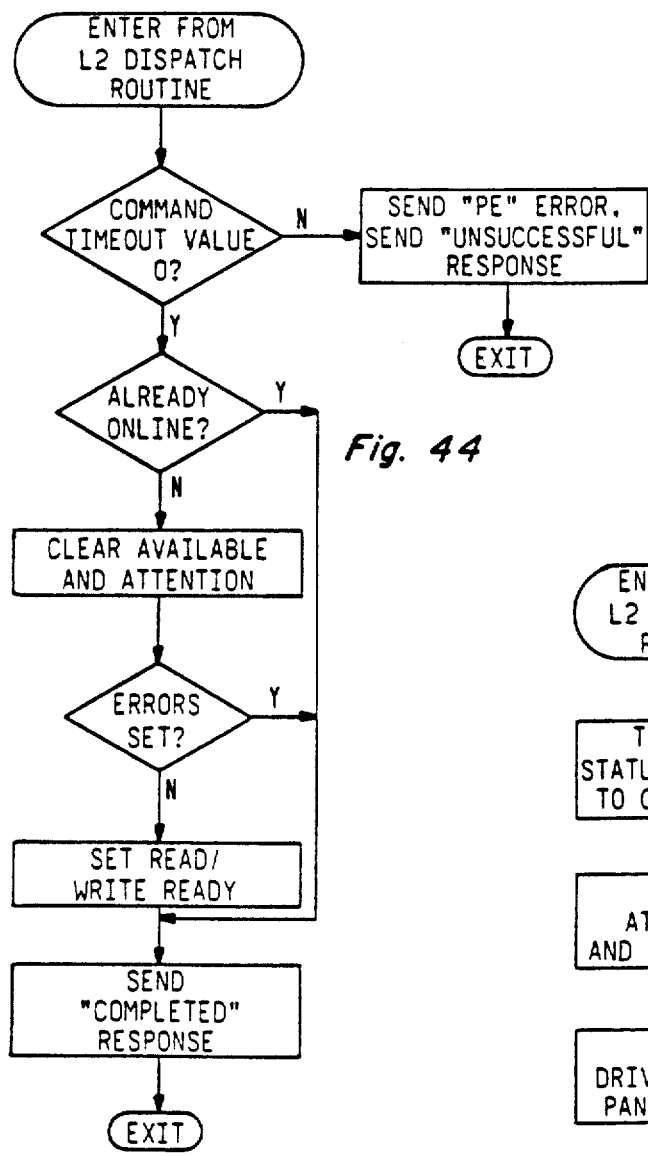
FIG. 44 is a flow chart of the drive's processing of the ONLINE command.
Figure 42:
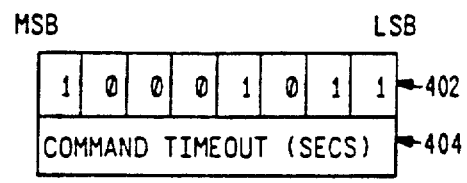
FIG. 42 is an illustration of the format of the ONLINE command.
Figure 43:
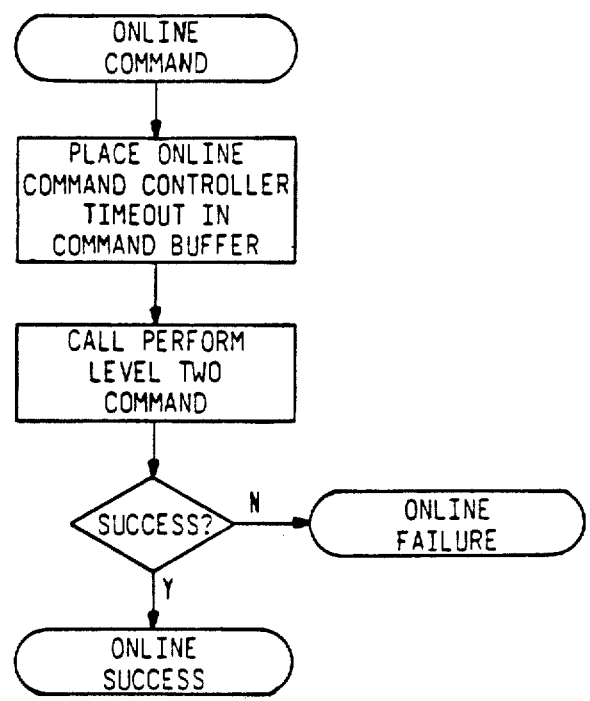
FIG. 43 is a flow chart of the controller's processing of the ONLINE command.

The ONLINE command has the two byte format illustrated in FIG. 42. Its processing by the controller is shown in FIG. 43; and by the drive, in FIG. 44. This command causes the drive to enter the "drive-online" state relative to the issuing controller. It also supplies the drive with the time out period to be used for its command timer. Upon completion of the exchange, the drive is "drive-online" to the issuing controller and "drive-unavailable" to all other ports.

The RUN, READ MEMORY, RECALIBRATE and WRITE MEMORY commands are uninteresting in so far as the present invention is concerned. Therefore, for the sake of clarity and brevity, they will not be explained further.

Figure 45:
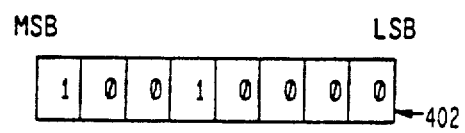
FIG. 45 is an illustration of the format of the TOPOLOGY command.
Figure 46:
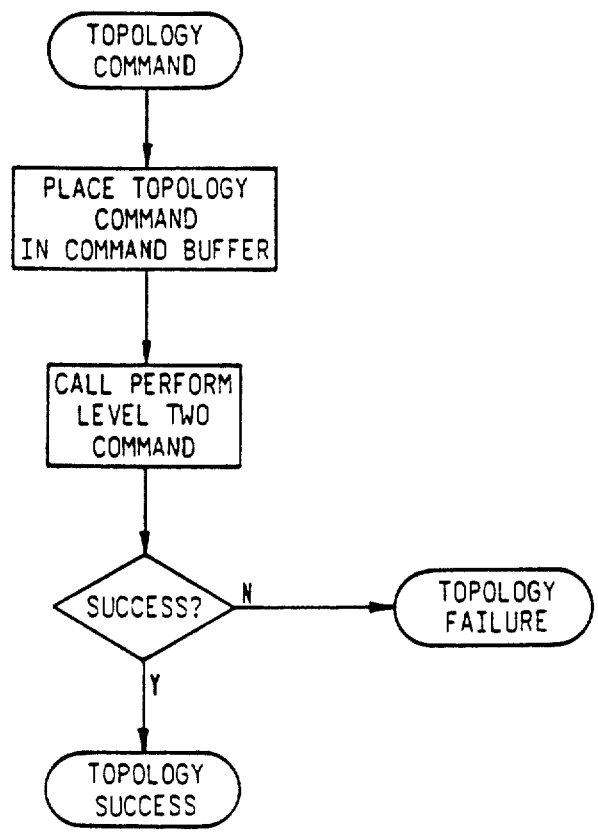
FIG. 46 is a flow chart of the controller's processing of the TOPOLOGY command.
Figure 47A:
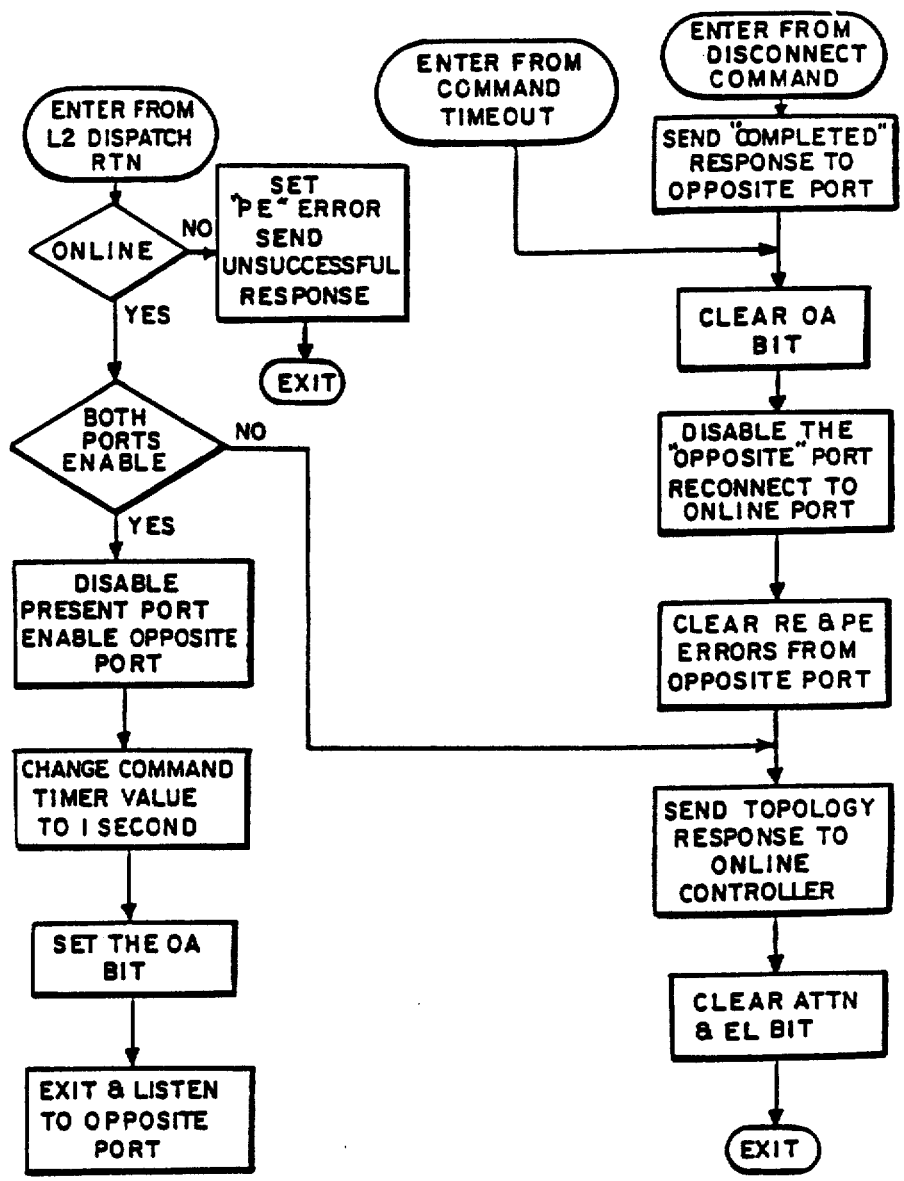
FIG. 47A is a flow chart of the drive's processing of the TOPOLOGY command.

The TOPOLOGY command has the one byte format illustrated in FIG. 45. The controllers' processing routine is shown in FIG. 46 and the drive's processing routine, in FIG. 47. This command instructs the drive to make itself available for dialog with any controller(s) on enabled alternate port(s).

The TOPOLOGY command is unique in its application. Its purpose is to permit the host to determine all possible paths to each drive in the system. Each host may connect to multiple controllers; conversely, each controller may be accessible to multiple hosts. In turn, each drive may be accessible by multiple controllers.

Figure 47B:
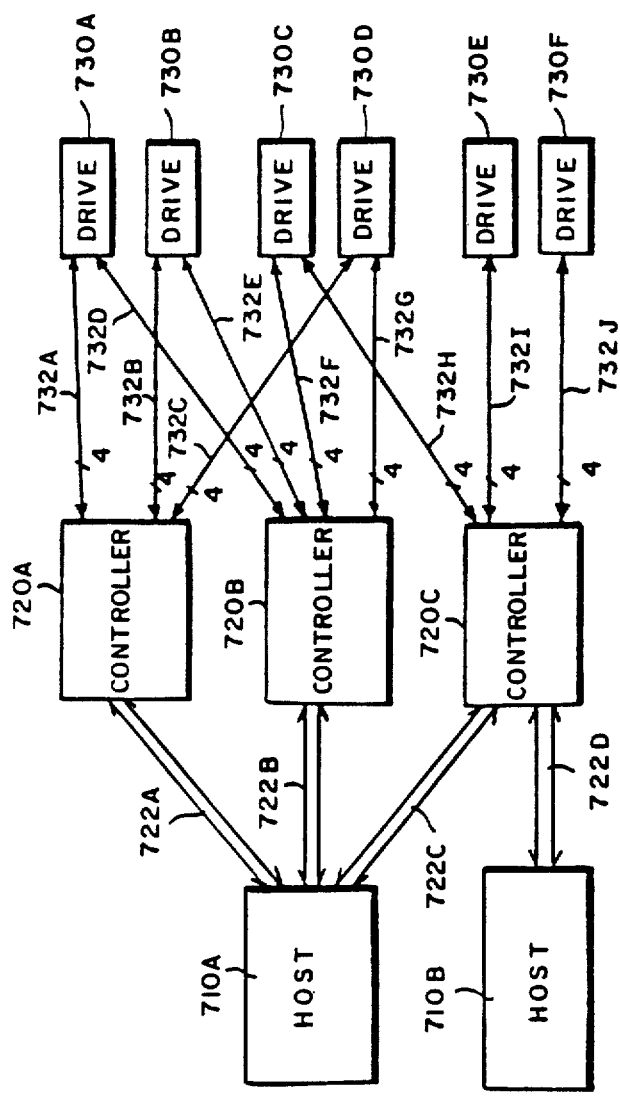
FIG. 47B is a block diagram of a system wherein the TOPOLOGY command of FIG. 45 is useful to determine system interconnections.

For example, FIG. 47B shows a pair of host processors 710A and 710B. Host processor 710A communicates with three disk drive controllers 720A, 720B and 720C, via the respective busses 722A, 722B and 722C. Host processor 720B communicates with only one controller, 720C, via a bus 722D. In turn, each of the controllers 720A-720C communicates with one or more disk drives 730A-730F. Thus, controller 720A communicates with drives 730A, 730B and 730D via the respective busses 732A, 732B and 732C. Controller 720B also communicates with drives 730A, 730B and 730D (via busses 732D, 732E and 732G, respectively), as well as with drive 730C (via bus 732F). An controller 720C respectively), as well as with drive 730C (via bus 732F). And controller 720C communicates with drives 730C, 730E and 730F (via busses 732H, 732I and 732J, respectively).

Thus drive 730C may be accessed by both hosts through controller 720C and by host 710A through controller 720B, as well. Some of the other drives are at least accessible through multiple controllers, if not by multiple hosts. Also, note that each of the busses 732A-732J is the same as bus 10 of FIG. 1.

Upon receipt and validation of the TOPOLOGY command the drive ceases transmitting drive state information through the port which was online and diverts its activity to the first of any enabled alternate ports. Leaving its actual state relative to all accessible controllers unchanged throughout this operation, the drive transmits AVAILABLE and ATTENTION signals to the alternate controller which are equivalent to those that would be transmitted if the drive were in the "drive-available" state relative to that controller, and prepares to execute commands. While attentive to the alternate port, the drive will receive and execute GET STATUS, GET COMMON CHARACTERISTICS, GET SUBUNIT CHARACTERISTICS, CHANGE CONTROLLER FLAGS and DISCONNECT commands as if the drive were in the "drive-available" state, except that the "OA" bit in the status summary will be asserted, and the bit in the DISCONNECT command is valid.

INIT signals and transmission and protocol errors are all processed as if the drive were in the "drive-available" state. The drive ceases being attentive to the alternate port when (1) a predetermined time expires or (2) a DISCONNECT operation with set is conducted successfully on the alternate port. (This exchange is a signal from the alternate controller that no further commands are forthcoming.)

Figure 48:
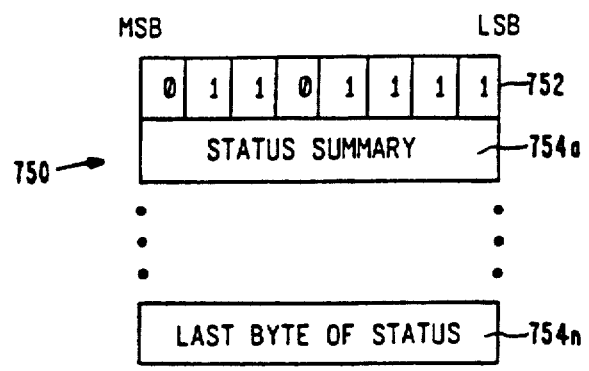
FIG. 48 is an illustration of the format of the response to a TOPOLOGY command.

Upon the occurrence of one of the above conditions, the drive clears "RE" and "PE" in its status summary and repeats the cycle on the next enabled alternate port, until all alternate ports have been covered. The state and data lines on the alternate ports are then restored to the "drive-unavailable" state, the state bits are set appropriately for transmission to the online controller, and state transmissions are resumed to the online controller. Finally, OA, RE and PE are cleared in its status summary and a TOPOLOGY response 750 (as shown in FIG. 48), if successful, is sent to the online controller. The TOPOLOGY response comprises an identifier byte 752 and a plurality of status summary bytes 754a-754n.

If a switch changes, or other attention condition occurs, while the drive is attentive to an alternate port, the appropriate status bit is changed but the ATTENTION signal is not raised. The online controller will resolve the condition on completion of the TOPOLOGY exchange. Upon receipt of the TOPOLOGY response, the controller must examine the status summary and make sure no attention conditions arose while the drive was busy interacting with other controllers.

Upon completion of the exchange, the drive state is unaltered relative to all controllers; head position is undefined.

As stated above, there are two universal drive responses: COMPLETED and UNSUCCESSFUL.

Figure 49:
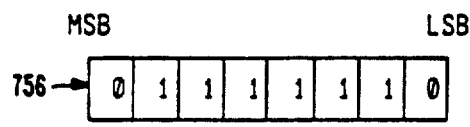
FIG. 49 is an illustration of the format of the generic COMPLETED response.

The COMPLETED response 756 is one byte in length and has the format indicated in FIG. 49. This response notifies the controller that the command which initiated the current exchange has been completed successfully without the need for unusual error recovery. It terminates the exchange and frees the controller to issue another command.

Figure 50:
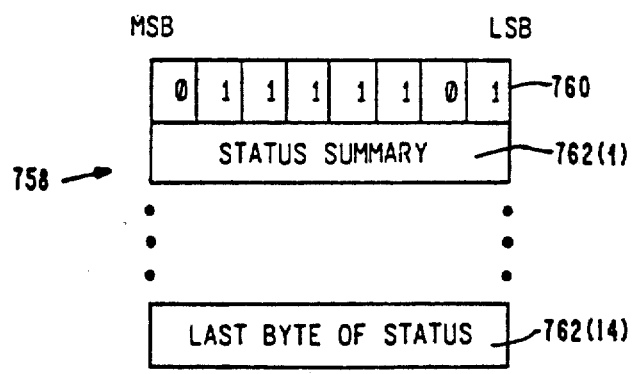
FIG. 50 is an illustration of the format of the generic UNSUCCESSFUL response.

The UNSUCCESSFUL response 758 is 15 bytes in length and has the format indicated in FIG. 50. Byte 760 identifies the response. Bytes 762(1)-762(14) are identical in format and content to the information returned in bytes 682-708 of the response to a GET STATUS command (see FIG. 44). This response notifies the controller that the command that initiated the command exchange could not be executed successfully. Information describing the overall nature of the error condition is included in the status summary portion of the response.

The UNSUCCESSFUL response 758 terminates the exchange and frees the controller to issue another command. Since at least one error bit will be set, it should be understood that certain command and data transfer operations are illegal until the errors are cleared.

Having thus described an exemplary embodiment of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed is:

1. A secondary storage system for a data processing system, said secondary storage system comprising a mass storage device, a controller for effectuating operations of the device, and an apparatus for establishing a communications path between the controller and device, said apparatus for establishing a communications path being capable of communicating command, response, data and status information on only four unidirectional channels, whereas similar information is normally communicated between a device and controller on more than four unidirectional channels by a standard apparatus for establishing a communication path, said apparatus comprising:

a radial bus, comprising substantially only first and second unidirectional channels for carrying signals from said controller to said device and third and fourth unidirectional channels for carrying signals from said device to said controller;

means associated with the controller for generating and applying to the first channel and means associated with the device for receiving from the first channel, a continuous transmission of sequences of bit-multiplexed, bit-serial, real-time, signals, each of said sequences being indicative of a set of status variables that define the state of the controller;

means associated with the controller for generating and applying to the second channel and means associated with the device for receiving from the second channel, bit-serial command messages and write data;

means associated with the device for generating and applying to the third channel and means associated with the controller for receiving from the third channel, a continuous transmission of sequences of bit-multiplexed, bit-serial, real-time signals, each of said sequences being indicative of a set of status variables that define the state of the device;

means associated with the device for generating and applying to the fourth channel and means associated with the controller for receiving from the fourth channel, bit-serial response messages and read data;

means associated with the controller, responsive to said sequences of signals indicative of a set of status variables of the device an responsive to said response messages and read data, for effectuating the operation of said controller;

means associated with the device, responsive to said sequence of signals indicative of a set of status variables of the controller and responsive to said command messages and write data, for effectuating the operation of said device; and wherein each of said sequence indicative of the state of the mass storage device is a bit pattern and wherein within said bit pattern indicative of the state of the device,
- A. a predetermined first bit provides a synchronization bit;
- B. a predetermined second bit provides a receiver ready signal;
- C. a predetermined third bit provides an attention signal;
- D. a predetermined fourth bit provides a read/write ready signal;
- E. a predetermined fifth bit provides a sector pulse signal; and
- F. a predetermined sixth bit provides an available status signal.

2. The apparatus of claim 1 wherein each of said sequences indicative of the state of the controller is a bit pattern of a predetermined length.

3. The apparatus of claim 2 wherein within bit said pattern indicative of the state of the controller
- A. a predetermined first bit provides a synchronization bit;
- B. a predetermined second bit provides a receiver ready signal;
- C. a predetermined third bit provides a write gate signal;
- D. a predetermined fourth bit provides a read gate signal; and
- E. a predetermined fifth bit provides an initialization signal.

4. The apparatus of claim 3 wherein said pattern further includes
- F. a predetermined sixth bit which serves as a parity bit.

5. The apparatus of claim 4 wherein said pattern further includes a plurality of bits of predetermined value comprising a preamble which preceeds said first bit.

6. The apparatus of claim 5 wherein the preamble comprises a predetermined number of a zero-valued bits.

7. The apparatus of claim 1 wherein said bit pattern indicative of the state of the device includes
- G. a predetermined seventh bit which serves as index pulse signal; and
- H. a predetermined eighth bit which serves as a parity bit.

8. The apparatus of claim 7 wherein said pattern further includes a plurality of bits of predetermined value comprising a preamble which preceeds said first bit.

* * * * *

UNITED STATES PATENT AND TRADEMARK OFFICE
CERTIFICATE OF CORRECTION

PATENT NO. : 4,811,279

DATED : March 7, 1989

INVENTOR(S) : McLean et al

It is certified that error appears in the above-identified patent and that said Letters Patent is hereby corrected as shown below:

On the cover page of the patent, delete the following inventor names: "Robert G. Bean; Micahel E. Beckman; Barry L. Rubinson; Edward A. Gardner;"; after "O. Winston Seargent" delete the ";" and substitute in its place --and--; after "Peter T. McLean," delete "all", and substitute in its place --both--; directly under the words "United States Patent", delete the named inventors "Bean et al." and substitute in its place the name --McLean et al.--.

In column 9, line 14, the number "44" should read --48--.

In column 14, line 18, the word "operatin" should read "operation".

In column 17, line 42, the number "404." should read --402.--.

In column 19, line 54, the number "510" should read --512--.

In column 22, lines 56-57, delete "An controller 720C respectively), as well as with drive 730C (via bus 732F)."

In claim 1, column 24, line 64, the word "an" should read --and--.

In claim 1, column 25, line 4, the word "sequence" should read --sequences--.

UNITED STATES PATENT AND TRADEMARK OFFICE
CERTIFICATE OF CORRECTION

PATENT NO. : 4,811,279

DATED : March 7, 1989

INVENTOR(S) : McLean et al

It is certified that error appears in the above-identified patent and that said Letters Patent is hereby corrected as shown below:

In claim 3, column 25, line 23, the words "bit said" should read --said bit--.

Signed and Sealed this

Fifteenth Day of May, 1990

Attest:

HARRY F. MANBECK, JR.

Attesting Officer     Commissioner of Patents and Trademarks

UNITED STATES PATENT AND TRADEMARK OFFICE
CERTIFICATE OF CORRECTION

PATENT NO. :   4,811,279
DATED      :   March 7, 1989
INVENTOR(S) :  Bean, et al.

It is certified that error appears in the above-identified patent and that said Letters Patent is hereby corrected as shown below:

In column 3, line 4, the word "DRAWING" should read --DRAWINGS--; in column 3, line 36, the word "issustrating" should read --illustrating--.

In column 6, line 54, the phrase "controller host" should read --controller-host--.

In column 12, line 2, the phrase 'drive available"' should read --"drive available"--.

In column 13, line 9, the word "states", immediately preceding the phrase "in response to", should read --status--; in column 13, line 21, the word "preding" should read --preceding--.

In column 21, line 50, the word "formating" should read --formatting--.

In column 22, line 11, the phrase "a cross" should read --across--.

Signed and Sealed this

Fifth Day of March, 1991

*Attest:*

HARRY F. MANBECK, JR.

*Attesting Officer*    *Commissioner of Patents and Trademarks*